United States Patent
Henchy

(10) Patent No.: US 12,300,121 B1
(45) Date of Patent: *May 13, 2025

(54) SYSTEMS AND TECHNIQUES FOR HYBRID LIVE AND REMOTE ON-DEMAND SESSIONS

(71) Applicant: FREEDOM TRAIL REALTY SCHOOL, INC., Boston, MA (US)

(72) Inventor: William Henchy, Boston, MA (US)

(73) Assignee: FREEDOM TRAIL REALTY SCHOOL, INC., Boston, MA (US)

( * ) Notice: Subject to any disclaimer, the term of this patent is extended or adjusted under 35 U.S.C. 154(b) by 309 days.

This patent is subject to a terminal disclaimer.

(21) Appl. No.: 17/859,937

(22) Filed: Jul. 7, 2022

Related U.S. Application Data

(63) Continuation-in-part of application No. 17/246,486, filed on Apr. 30, 2021, now Pat. No. 11,410,567, which is a continuation of application No. 16/892,160, filed on Jun. 3, 2020, now Pat. No. 11,024,190.

(60) Provisional application No. 63/302,351, filed on Jan. 24, 2022, provisional application No. 62/856,951, filed on Jun. 4, 2019.

(51) Int. Cl.
*G09B 5/06* (2006.01)
*G06Q 50/20* (2012.01)

(52) U.S. Cl.
CPC ........... *G09B 5/065* (2013.01); *G06Q 50/205* (2013.01)

(58) Field of Classification Search
CPC .............................. G09B 5/065; G06Q 50/205
See application file for complete search history.

(56) References Cited

U.S. PATENT DOCUMENTS

| | | | |
|---|---|---|---|
| 8,768,240 B2 * | 7/2014 | Packard | G09B 7/06 434/362 |
| 2006/0031083 A1 | 2/2006 | Dalal et al. | |
| 2006/0035205 A1 | 2/2006 | Dobson et al. | |
| 2007/0259324 A1 * | 11/2007 | Frank | G09B 5/14 434/322 |

(Continued)

FOREIGN PATENT DOCUMENTS

WO WO2014085768 A1 6/2014

OTHER PUBLICATIONS

International Search Report and Written Opinion mailed Mar. 30, 2023 received in corresponding PCT Application No. PCT/US2023/061191 in 13 pages.

*Primary Examiner* — Malina D. Blaise
(74) *Attorney, Agent, or Firm* — Straylight LLP

(57) ABSTRACT

Systems and techniques are provided for hybrid on-demand and live learning systems. A method can include establishing a class session with remote participants; sending class content to a device of a participant; classifying a session of the participant as an on-demand or live session based on an availability of an instructor to communicate with the participant during the session; tracking, based on messages between the device and an online system, time spent by the device in the live session and/or time spent in the on-demand session; based on a result of classifying the session as the on-demand or live session, adding the time spent in the session to a live time counter or an on-demand time counter for the participant; and determining a time spent value based on the live time counter and the on-demand time counter.

20 Claims, 22 Drawing Sheets

(56) References Cited

U.S. PATENT DOCUMENTS

| | | | |
|---|---|---|---|
| 2008/0050715 A1* | 2/2008 | Golczewski | G06Q 10/063112 |
| | | | 434/350 |
| 2008/0059484 A1* | 3/2008 | Packard | G09B 19/00 |
| 2013/0096892 A1 | 4/2013 | Essa et al. | |
| 2013/0216990 A1* | 8/2013 | Chu | G09B 5/065 |
| | | | 434/247 |
| 2013/0249947 A1 | 9/2013 | Reitan | |
| 2014/0317240 A1 | 10/2014 | Handsaker et al. | |
| 2015/0154291 A1 | 6/2015 | Shepherd et al. | |
| 2016/0026253 A1 | 1/2016 | Bradski et al. | |
| 2016/0042654 A1* | 2/2016 | Fieldman | G09B 5/06 |
| | | | 434/362 |
| 2016/0180248 A1* | 6/2016 | Regan | G09B 5/00 |
| | | | 706/12 |
| 2016/0364087 A1* | 12/2016 | Thompson | H04N 13/351 |
| 2018/0301046 A1* | 10/2018 | Nedivi | H04L 51/046 |
| 2018/0350144 A1* | 12/2018 | Rathod | G06Q 20/3224 |
| 2018/0366017 A1* | 12/2018 | Kenny | G09B 5/10 |
| 2019/0004639 A1 | 1/2019 | Faulkner | |
| 2019/0110096 A1 | 4/2019 | Shaw et al. | |
| 2019/0294700 A1 | 9/2019 | Lockwood et al. | |
| 2019/0325765 A1 | 10/2019 | Wakefield | |
| 2020/0051460 A1 | 2/2020 | Bedor et al. | |
| 2020/0160740 A1* | 5/2020 | Nedivi | G09B 7/00 |
| 2020/0349751 A1 | 11/2020 | Bentovim et al. | |
| 2021/0004926 A1* | 1/2021 | Foster | G06Q 50/205 |
| 2022/0014568 A1* | 1/2022 | Avida | H04L 65/403 |
| 2022/0114900 A1* | 4/2022 | Qiu | G06N 3/08 |
| 2022/0303877 A1* | 9/2022 | Choi | H04L 67/51 |

\* cited by examiner

FIG. 5A (Continued)

Change Course

Platform Access Hours — 518
⊙ 16 hours

How was your interests in real estate class? — 520
:(  :|  :)
Submit Feedback

Course Materials — 522
▫ Course Study Guide (PDF)

⊗

Real Estate Financing

State Law
- Monday 3/25 at 8:00 PM EDT
- 2 hours 15 minutes long
- Topics: Massachusetts Real Estate Licensing Law
- Instructors: Lisa L.

534D

The Basics
- Tuesday 3/26 at 3:00 PM EDT
- 2 hours 15 minutes long
- Topics: The Basics
- Instructors: Dr. Smith

534E

Property Rights
- Tuesday 3/26 at 6:00 PM EDT
- 2 hours 15 minutes long
- Topics: Property Rights
- Instructors: Jane Doe

534F

Interests In Real Estate
- Wednesday 3/27 at 11:00 AM EDT
- 2 hours 15 minutes long
- Topics: Interests In Real Estate
- Instructors: Jane Doe

534G

Property Right Limitations
- Wednesday 3/27 at 6:00 PM EDT
- 2 hours 15 minutes long
- Topics: Property Right Limitations
- Instructors: Dr. Smith

534F

Property Valuation
- Thursday 3/28 at 11:00 AM EDT
- 2 hours 15 minutes long
- Topics: Property Valuation
- Instructors: Jane Doe

Upcoming Live Online Class Schedule

You can take the entire 40 hour license class as a live online webinar, or mix live webinars and on demand streaming classes to complete the license course on your own schedule. Live class webinars are offered days, nights, weekends, and on demand classes are available 24/7.

570

572  `< 1 2 3 4 5 >`  574

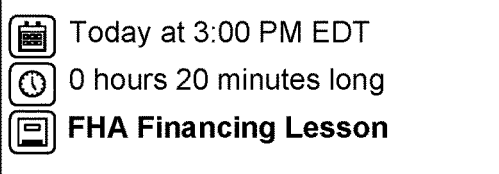
Today at 3:00 PM EDT
0 hours 20 minutes long
FHA Financing Lesson

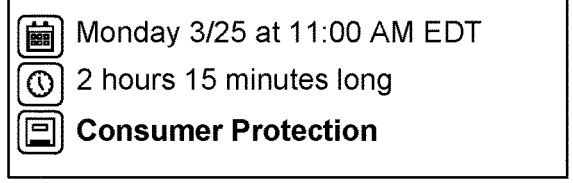
Monday 3/25 at 11:00 AM EDT
2 hours 15 minutes long
Consumer Protection

580

582

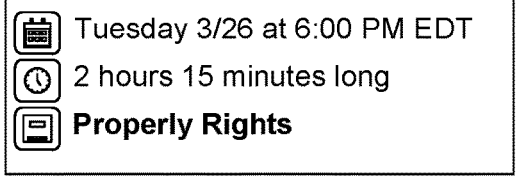
Tuesday 3/26 at 6:00 PM EDT
2 hours 15 minutes long
Properly Rights

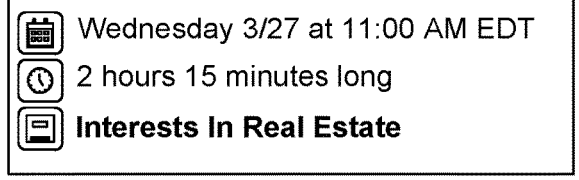
Wednesday 3/27 at 11:00 AM EDT
2 hours 15 minutes long
Interests In Real Estate

588

590

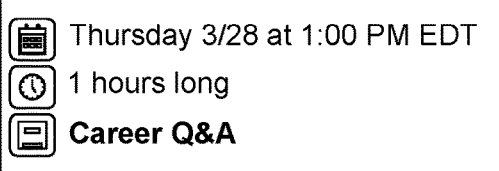
Thursday 3/28 at 1:00 PM EDT
1 hours long
Career Q&A

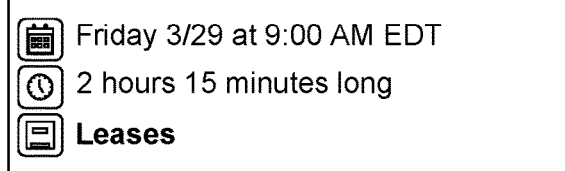
Friday 3/29 at 9:00 AM EDT
2 hours 15 minutes long
Leases

FIG. 5E

Instructor Dashboard - John Doe

Next Live Online Class

Sunday, November 26th 2021 at 11:51 AM - 2 hours

The Basics

Instructors: John Doe | Course: MA Salesperson

Topics: The Basics, Property Rights,..., Leases

☐ Your Upcoming Live Class Schedule

The Basics - MA Salesperson - Sunday, November 26th 2021 at 11:51 AM - 2 hours 💬 Chat Sessions Starts Soon Today at 4:30 PM EST — [Start Session]

Live Instructor Chat Session: MA Salesperson License Course

💬 Your Upcoming Chat Session Schedule

Massachusetts Salesperson License Course —
Thursday, November 18th 2021 at 4:30 PM - 2 hours

Class Resources
- Class Materials
- Vocabulary Terms

Student Feedback (Past 4 weeks)
- Example Feedback

Teaching Schedule
Student Feedback
Class Archives
Class Followup

FIG. 9

SYSTEMS AND TECHNIQUES FOR HYBRID LIVE AND REMOTE ON-DEMAND SESSIONS

CROSS-REFERENCE TO RELATED APPLICATIONS

This application claims priority to U.S. Provisional Application No. 63/302,351, filed on Jan. 24, 2022, entitled SYSTEMS AND TECHNIQUES FOR HYBRID LIVE AND REMOTE ON-DEMAND CLASSES AND INSTRUCTIONS", the contents of which are hereby incorporated by reference in their entirety. This application is also a continuation-in-part (CIP) of U.S. Non-Provisional patent application Ser. No. 17/246,486, filed on Apr. 30, 2021, entitled "ONLINE CLASSES AND LEARNING COMPLIANCE SYSTEMS AND METHODS"; which is a continuation of U.S. Non-Provisional patent application Ser. No. 16/892,160, filed on Jun. 3, 2020, now U.S. Pat. No. 11,024,190, entitled "ONLINE CLASSES AND LEARNING COMPLIANCE SYSTEMS AND METHODS"; which claims the benefit of, and priority to, U.S. Provisional Patent Application No. 62/856,951, filed on Jun. 4, 2019, entitled "ONLINE CLASSES AND LEARNING COMPLIANCE SYSTEMS AND METHODS". The contents of all the aforementioned applications are hereby expressly incorporated by reference in their entirety and for all purposes.

TECHNICAL FIELD

The present disclosure generally relates to systems and technologies for hybrid live and remote on-demand sessions. For example, in some aspects, the present disclosure relates to systems and technologies for hybrid live and remote on-demand class sessions including chat controls for live classes and instruction and techniques for tracking user progress across live and on-demand services.

BACKGROUND

Online learning has become an increasingly popular and important mode of training, education and certification. Online learning can provide education at a lower cost, increased access to education through remote access, and greater flexibility to students, among other benefits. However, managing online learning, such as managing scheduling, managing online content, tracking user course progress, managing user compliance, etc., can present greater challenges than traditional learning environments. The challenges can be even greater if an online course involves more complex functionalities, requirements, systems, etc.

BRIEF DESCRIPTION OF THE DRAWINGS

Illustrative examples of the present application are described in detail below with reference to the following figures:

FIG. 9 illustrates an example user interface displaying an example dashboard of an instructor user, in accordance with some examples of the present disclosure;

DETAILED DESCRIPTION

Figure 1:
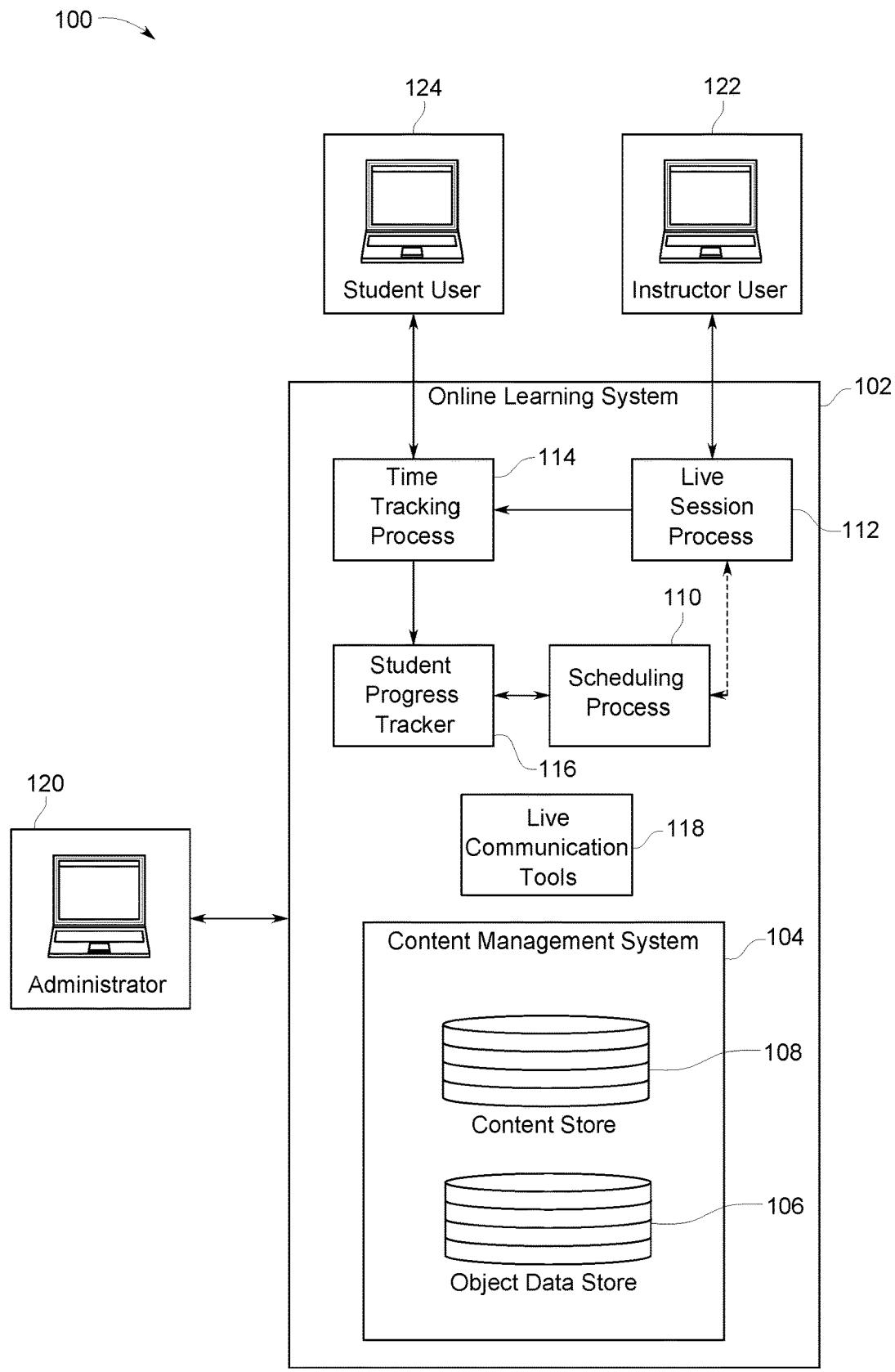
FIG. 1 is a diagram illustrating an example online learning environment, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, online learning has become an increasingly popular and important mode of training, education and certification. Online learning can provide education at a lower cost, increased access to education through remote access, and greater flexibility to students, among other benefits. However, managing online learning, such as scheduling, online content, user course progress, user compliance, etc., can present greater challenges than traditional learning environments. This is especially true if an online course involves more complex functionalities, requirements, systems, etc. There can also be significant challenges if a course or class provider wants to provide different modes of learning and instruction, such as live classes, on-demand (e.g., pre-recorded and/or pre-packaged) classes, etc. For example, it can be quite difficult to track a student's class time and progress when the student consumes both live class content and on-demand class content.

Moreover, an online learning system may want to implement interactive features where students can interact with instructors such as, for example and without limitation, a chat, a messaging tool, a voice and/or video conferencing tool, a communication widget, etc. The interactive features can provide students an opportunity to interact with an instructor with questions and other forms of dialogue, and can enrich the overall learning experience. However, in some cases, with increasing student attempts to interact with an instructor, the instructor can become overwhelmed by the student interactions and/or efforts to interact with the instructor. The interactive features may also enable certain students to misbehave by initiating an excessive amount of interactions, initiating inappropriate interactions, etc. In some cases, the interactive features can generate distractions and, if not managed adequately, can negatively impact the overall learning experience of students and teaching experience of instructors.

Systems, apparatuses, methods (also referred to as processes), and computer-readable media (collectively referred to herein as "systems and techniques") are described herein for hybrid live and remote on-demand classes and instruction. In some examples, a system for hybrid live and remote on-demand classes and instruction can include controls for interactive features available during live classes and instruction, such as chat controls and/or other messaging controls (e.g., voice messaging, video messaging, text messaging, etc.). The controls can allow an instructor to enable and disable interactive functionalities during a live class and/or instruction session, such as chat functionalities and/or other messaging functionalities.

For example, an instructor using a system for hybrid live and remote on-demand classes and instruction as described herein can enable interactive functionalities as needed or desired at any time during a live class and/or instruction session. At any point during the live class and/or instruction session, the instructor can also pause or disable interactive functionalities to prevent students from initiating communications with the instructor or other students. For example, if the use of interactive functionalities by students in a live class or instruction session becomes unruly, the instructor can pause or disable the interactive functionalities to prevent further disruptions. The instructor can pause or disable the interactive functionalities for all students in the live class or instruction session or a selected subset of students in the live class or instruction session. The instructor can re-enable or resume the interactive functionalities at any point during the live class or instruction session.

In some aspects, the controls can allow a student to notify the instructor that the student wishes to submit a question or comment to the instructor or otherwise interact with the instructor. For example, the controls can allow a student to "raise her hand" virtually, to indicate to the instructor that the student is requesting an opportunity to submit a question or comment or otherwise interact with the instructor. In some cases, the controls can allow the instructor to call on one or more students during a live class or instruction session. For example, the instructor can use the controls to notify a student that the student has an opportunity to interact with the instructor and/or to inform the student that the instructor wants the student to answer a question or comment on a topic.

In some cases, the controls can allow a student to "lower her hand" virtually after raising her hand, in order to signal that the instructor (or another student) has answered her question. In some implementations, the system for hybrid live and remote on-demand classes and instruction described herein can impose limits on the raising and/or lowering of hands by students. For example, the system can limit the number of times a student (and/or all students in a session) can raise and/or lower her hand in order to prevent disruptions and/or malicious behavior, such as spamming the hand raise message repeatedly, which can create disruptions and/or interrupt the flow of a class session. Such limits can be tracked in one or more data structures, such as an array of dictionaries, containing user identifiers (IDs) and hand raise counts (e.g., integers) during class/teaching sessions. The hand raise counts can be incremented for each student (or for all students) whenever the student raises their hand. The system can prevent further hand raising when a student (or all students) reaches a predetermined limit (e.g., a limit set by an administrator or the instructor). In some cases, the hand raise count can be reset if the instructor later allows for student interactions so students may raise their hands again.

In some aspects, the system for hybrid live and remote on-demand classes and instruction described herein can implement techniques for tracking user progress across live and on-demand services. For example, the system can allow students to consume live content and on-demand content for any particular class. The system can track the amount of time the students consumed live and on-demand content for the particular class, and calculate an overall time spent by each student consuming the live and on-demand content, in order to determine an amount of class credit earned by the student and/or a class progress by the student.

For example, certain courses may have a requirement that students participate in a certain amount of live class or instruction time, in order to satisfy the requirements for completing and/or receiving credit for such courses. In such cases, students may be allowed to fulfill some of the time requirements for a course through both on-demand and live class/instruction, but may be required to complete at least a minimum amount of the total required course time through live class/instruction. Accordingly, the system can track the users time engaged in a course through on-demand class content and live class content/instruction. The system can determine the overall course time for the user and determine whether the user has satisfied the overall course time required for course completion and whether the user has satisfied at least the minimum amount of live class/instruction time required for that course.

An on-demand session (e.g., an on-demand class/course session, on-demand class/course content session, etc.) can refer to any class/course content session where an instructor is not available during the session for live interaction with the student(s) engaged in the class/course content session. For example, an on-demand session can include a session where the user consumes and/or interacts with pre-recorded and/or pre-packaged content associated with a class/course, such as pre-recorded and/or pre-packaged video content, audio content, text content, multimedia content, and/or any other type of content. The class/course content for an on-demand session can be prepared and published online for users to select and complete/consume whenever they choose. A user can access on-demand content and initiate an on-demand session remotely from the user's client device. The on-demand content can be stored on a server(s) and accessible to the user from the user's device.

On the other hand, a live session (e.g., a live class/course session, live class/course content session, etc.) can refer to any class/course content session where an instructor is available during the session for live interaction with the student(s) engaged in the class/course content session. For example, a live session can include a session where a user is able to communicate/interact with an instructor during the live session. In some examples, a live session can be streamed live and accessed by users in real time (or substantially real time) from their device. In other examples, a live session can include a session where one or more users consume and/or interact with pre-recorded and/or pre-packaged content associated with a class/course while an instructor is available to communicate/interact with the one or more users.

For example, if a user initiates an on-demand session (e.g., a session with on-demand content) while an instructor is available to communicate/interact with the user during the session, the session can be classified as a live session even though the content consumed by the user is pre-recorded/pre-packaged on-demand content. Since the instructor is available during the live session, the user can use interactive features of the system to communicate/interact with the instructor during the session, such as by asking questions, answering questions, submitting comments, etc. If, on the other hand, the instructor is not available for live communication/interaction with the user during the session, the session would otherwise be classified as an on-demand session. Thus, a live session can include a livestreaming class/course session, an on-demand class/course session where an instructor is available for live communication/interaction with the student(s), and/or a live in-person class/course session.

In some cases, a session can start as an on-demand session and switch to a live session before the session ends, and vice versa. For example, if a student accesses an on-demand session and an instructor subsequently becomes available for live communication/interaction with the student, the on-demand session can change to a live session. The system can classify a portion of the session as an on-demand session (e.g., the portion in which the instructor is not available for live communication/interaction with the student) and another portion of the session as a live session (e.g., the portion in which the instructor is available for live communication/interaction with the student). The system can track the time spent by the student in the portion classified as an on-demand session and the time spent by the student in the other portion classified as the live session. The system can use the time spent by the student in the on-demand portion and the live portion to calculate a total time spent by the student and track a progress of the student with respect to a class/course associated with the on-demand and live sessions.

In some examples, to track a user's time spent, the system can periodically send reachability messages (e.g., ping, etc.) to the user's device to verify the user's engagement/participation in an on-demand or live session. In some examples, to track the user's time spent, the user's device can additionally or alternatively send reachability messages to the system. The system can use the reachability messages to confirm the user's engagement/participation in the on-demand or live session. In some cases, a reachability message can include a timestamp indicating the time of the reachability message (and thus the time of the on-demand or live session and/or the user's engagement/participation in the on-demand or live session). In some cases, a reachability message can additionally or alternatively include information about the class/course associated with the session, the instructor associated with the class/course and/or session, the user associated with the session, the user's device associated with the session, the location of the user's device, a portion of content associated with the session, and/or any other information.

The ability to track time spent by the user with live and on-demand sessions associated with a class/course allows the user to receive credit for time spent in live and on-demand class/course formats or schemes. Moreover, the different online class/course formats or schemes (e.g., on-demand, live online or livestreamed, in-person, etc.) can provide various benefits to the user. For example, live online classes/courses encourage user engagement and interaction, as the users may ask questions and have discussions with the instructor and/or with other users. On-demand classes/courses offer flexibility in course pacing and scheduling, and are able to incorporate course materials from various media types (e.g., video lectures, text content, interactive quizzes, etc.). In some cases, a user may wish to complete a course using a combination of the two formats/schemes. As an example, a user taking courses to obtain a license as a real estate agent may want to take a certain number of hours of live courses to establish some level of competence under a live instructor, but may want to complete the rest of the course material on-demand for more scheduling flexibility.

The systems and techniques described herein can provide users flexibility to mix and match live and on-demand classes, courses, programs, etc., at the user's discretion or preference. Moreover, the systems and techniques described herein can automatically reconcile the user's progress through combined live and on-demand classes, curses, programs, etc. Rather than progress being predefined and inflexibly accounted for, the systems and techniques described herein can track time and progress across different course formats/schemes, such as live and on-demand formats/schemes, and can reconcile the time and progress across the different course formats/schemes to allow users to combine different formats/schemes and obtain credit for time and progress made in any course format/scheme.

In some examples, credit for online classes/courses can be given on the basis of course time (potentially including specific requirements and/or limitations for live courses and/or on-demand courses), course load completion, and/or other requirements, preferences, rules, etc. Moreover, user progress can be tracked and related to various respective activities to ensure compliance with, for example and without limitation, licensure rules and the like. User progress can be tracked based on time spent by the user in a class/course accessed by the user through an on-demand session, a live session, or both. In some examples, time spent by the user in a live session and on-demand session can be tracked and reconciled to calculate an overall progress for the user that accounts for time spent in both the live and on-demand sessions.

While the present disclosure is described in various places with reference to certain classes/courses, it should be appreciated by those of skill in the art that the disclosure has broader applications such as, for example and without limitation, other training, licensing, educational, social, coaching, fitness, and/or structured programs, courses, curricula, etc.

Generally, a user object data store of the system may store a unique user object for each user of the system. The user object data store may include or be implemented by a server(s), cloud provided storage solution, distributed database or storage system, data center, and/or other content storage solution. The user object can contain identifying information for the user. The identifying information may include, for example, a user's name, username, password, profile, etc. In some cases, the user object may also include a group identification field that identifies the user with different groups that have respective levels or types of access to the system. For example, a user may be a student, instructor, and/or an administrator. A student can take classes/courses and track their class/course completion progress through an online system as described herein. An instructor can publish and broadcast course content through the online system as described herein. An administrator can make modifications to the system. In certain situations, a user may belong to multiple groups. For example, a user may be both an instructor and an administrator.

Each student user object is associated with at least one progress object, which can be or represent a type of user record. A student may be associated with multiple progress objects if the student is undertaking multiple classes/courses. For example, in a real estate salesperson licensing program, a student may take multiple courses to become licensed in multiple states. As different states have different licensing requirements, classes/courses may have correspondingly different topic requirements and/or completion requirements, such as live class attendance, total time spent in class, etc. In some cases, separate progress objects may track user progress in each class/course.

Progress objects can contain one or more fields which may track a user progress for each course completion requirement. In the example of real estate salesperson licensing courses, the progress object may contain one or more fields for classes completed, topics covered, time spent in live classes, time spent in on-demand classes, total time spent on the course, etc. Separate time spent counters can exist for each of the categories of time spent. Each progress object may also contain additional information such as user activity logs, a last update time for the progress object, etc.

In some examples, each progress object can be updated when the user uses the system. In some cases, student user access to classes may be based on, for example, a "class_type" variable associated with a curriculum and/or jurisdiction, access Booleans "live_class_access" and "self_study_access" denoting whether the student user is able to access particular class types (e.g., live class, on-demand classes, etc.), etc. Details of access to live classes can be tracked in a "live_class_attendance" data structure within the progress object. The "live_class_attendance" data structure can hold various data such as reference information, attended topics, course completion flags, update records, activity logs, etc.

An "on_demand_progress" data structure can store tracked time for particular on-demand classes as well as lessons, chapters, and/or other constituent sections of the particular course. For example, a property rights class can include a real property lesson and associated lesson completion information (e.g., "date" and "completed" data structures). While a real property lesson is completed (e.g., a respective "completed" variable is set to "true"), the overall chapter (e.g., "property-rights" data structure) is incomplete (e.g., associated with a respective "completed" variable set to "false").

Class attendance time can be granularly tracked in order to comply with any requirements, such as licensure requirements (e.g., State Department of Professional Licensure, etc.). In one example, a professional license (e.g., real estate broker license, etc.) may require no more than 19 hours of on-demand courses and 40 hours total class time (e.g., at least 21 hours live). Accordingly, tracked time spent on a class can be categorized, either implicitly or explicitly, as "live" class time or "on-demand" class time.

In some cases, live classes can be broadcast at specific times. These broadcast times can be predetermined by the instructors and/or administrators, and are made available to students through a graphical user interface ("GUI"). Students may be required to attend these courses online as the class is being broadcast by the instructor to receive credit for live class completion. In other cases, an on-demand class accessed by a student on-demand can be classified as a live class if an instructor is available through the system to communicate/interact with the student during the class (e.g., live and/or on-demand).

The system may verify a user's completion of course requirements in various ways. In one example, the user's device may send a data packet via one or more networks, such as the Internet, to the system server at certain time intervals (e.g., random intervals, predefined intervals, etc.) as the student is using the system to view associated content. When the system server receives the data packet from a user, it logs the time that the packet was received. Once multiple data packets have been received by the system server, the system may compare the last-received time to the first-received time to calculate the user's attendance time for the current session (e.g., live session or on-demand session). In some examples, a client-side process can track the user's attendance time concurrent to the system server tracking. The client-side process may report tracked time to the system server and both the system server tracking time and client side tracked time may be compared to determine a time tracking before logging the time. As a result, client-side manipulation of tracking may be avoided.

Once the student has been determined to have attended a class for a sufficient amount of time (e.g., a live class attendance minimum, etc.) the system may update the student's corresponding progress object to show that the user has completed the respective class. A live class attendance minimum can be predetermined and, in some examples and without imputing limitation, may be based on a respective jurisdiction, a specific program, a specific institution, and/or the like. For example, a state real estate salesperson licensing program may require students to attend a proportion of classes in a "live" (e.g., via livestream, etc.) session or may require a certain number of hours of a particular class or topic to be attended to in a live setting by a student in order to receive credit.

In some cases, on-demand classes can be managed through a content management system (CMS). Typically, on-demand classes can incorporate video content, text content, image content, and/or any other content. In an example, the video content may be a recording of a live version of the class. This recording may be edited into smaller segments such that other types of class content may be integrated between each lesson. If there are multiple video recordings from multiple live offerings of the class, an administrator may select one or more of the recordings to be used in the on-demand version of the class. Alternatively, specifically recorded video content from a source other than a live version of the class may be included, and content from other online sources may be embedded by an administrator in the on-demand class content as well.

As mentioned above, on-demand classes may include multiple lessons. Each lesson itself may contain video content, text content, image content, and/or any other content. In one example, a lesson may include interactive content. The interactive content may be a collection of quiz questions, and a student may be required to achieve some predetermined threshold percentage of correctness to receive credit for the class. In another example, the interactive content may include a collection of exercise problems for which the student's performance level is not determinate of course completion.

One or more classes can be organized into a respective chapter of a class. In one example, a chapter object (e.g., associated with a respective chapter of a class) may reference a quiz object for which the student's performance may affect respective completion statuses (e.g., for particular students, etc.) of the class.

In some examples, an online learning system can be used to manage the on-demand class content. The content and the organization of the on-demand classes may be accessed and/or modified by an administrator user via a graphical user interface. In some examples, the online learning system may include one or more databases hosted on one or more servers or the like. For example, the online learning system can include a content management system (CMS) that hosts content and/or databases for course content, metadata, course requirements, etc., as further described herein. In some examples, the online learning system may be provided over a cloud environment such as via cloud storage solutions, etc.

FIG. 1 is a diagram illustrating an example online learning environment 100, in accordance with some examples of the present disclosure. The online learning environment 100 allows users to access on-demand course content (e.g., through on-demand sessions) and live online course content (e.g., through live sessions), as further described herein. The online learning environment 100 thus provides a hybrid learning system where users can participate in both live and on-demand sessions.

The online learning environment 100 includes an online learning system 102. The online learning system 102 can include a content management system 104, a scheduling process 110, a live session process 112, a time tracking process 114, a student progress tracker 116, and live communication tools 118. The content management system 104 can include an object data store 106 and a content store 108. In some examples, the online learning system 102 can include additional components such as, for example, one or more processors (e.g., central processing units (CPUs), graphics processing units (GPUs), digital signal processors (DSPs), etc.), one or more circuits (e.g., application-specific integrated circuits (ASICs), field-programmable gate arrays (FPGAs), system-on-chips (SOCs), etc.), one or more caches, one or more communications interfaces, one or more displays, one or more memory devices, one or more storage devices, one or more logical entities (e.g., virtual machines, software containers, virtual resources, virtual infrastructure, etc.), one or more input devices, one or more machine learning models (e.g., neural networks, etc.), one or more artificial intelligence models, etc.

The online learning system 102 can host online programs and content, such as courses, trainings, certification programs, licensing programs, etc. Moreover, the online learning system 102 can manage schedules, programs, user progress, live sessions, on-demand sessions, interactive tools (e.g., chat functionalities, audio messaging functionalities, video messaging functionalities, text messaging functionalities, call/conferencing functionalities, users enrolled or participating in programs, instructors, program requirements, etc. The online learning system 102 can also track time spent by a student attending live class sessions and on-demand class sessions, track program progress (e.g., based on time spent and/or any other parameters), generate program schedules, predict program completion schedules/times, etc., as further described herein.

Student users may access the online learning system 102 through a student device 124. The student device 124 can include a remote terminal such as, for example and without limitation, a laptop computer, desktop computer, mobile device, smart television, smartphone, smart wearable device (e.g., head-mounted display, smart glasses, etc.), tablet computer, and the like. Student users can manage respective student accounts, attend live class sessions (e.g., livestreamed classes, on-demand classes with live instructors available during the on-demand classes, in-person classes, etc.), access on-demand class/course content (e.g., recorded classes without a live instructor, pre-packaged class/course content without a live instructor), leave course and/or content reviews, interact with content (e.g., quizzes, tests, interactive modules, course/class exercises, etc.), review or modify a program schedule, etc.

Instructor users may access the online learning system 102 through an instructor device 122. The instructor device 122 can include a remote terminal such as, for example and without limitation, a laptop computer, desktop computer, mobile device, smart television, smartphone, tablet computer, smart wearable device, and the like. Instructor users may access and/or modify a class page, retrieve content (e.g., student quizzes, homework, tests, exercises, projects, etc.), teach live classes via online conferencing and/or streaming (e.g., video conferencing and/or streaming, audio conferencing and/or streaming, etc.), maintain a live online presence for live sessions (e.g., to communicate/interact with student users), manage (e.g., enable, disable, initiate, end, moderate, create, etc.) and participate in live sessions (e.g., via tools and/or widgets available through the online learning system 102 such as chat tools, audio messaging tools, video messaging tools, text messaging tools, call and/or conferencing tools, livestreaming tools, etc.), manage (e.g., enable, disable, initiate, end, moderate, create, etc.) live session communications and/or interactions, etc.

The online learning system 102 can track time spent by a student user accessing live and on-demand sessions, participating in live and on-demand sessions, interacting with live and on-demand course/class content, etc. The online learning system 102 can monitor, reconcile, and credit the time spent via the time tracking process 114. The time tracking process 114 can track, reconcile, and credit time based on one or more factors or requirements such as, for example and without limitation, jurisdictional requirements (or other preferences and/or requirements) for course requirements (e.g., professional course requirements such as real estate salesperson licensure requirements, continued education requirements, etc.), factors and/or requirements specified by a course/class provider, subject matter requirements, industry requirements, certification requirements, statutory requirements, and/or other standards, preferences, and/or requirements.

In some cases, a particular course, class, program, etc., may have certain attendance time requirements and/or constraints. For example, a particular course, class, program, etc., may have a requirement imposing a maximum amount of time a student user may receive credit for through on-demand sessions and/or a minimum amount of time the student user needs to complete through live sessions. For example, assume a course has a 40 hours requirement for completing the course. This means a student user must complete 40 hours of course time/attendance to complete the course and/or receive credit for the course. In some cases, the course may have a requirement that at least n number of hours of the total 40 hours be completed through live sessions and/or that no more than n number of hours of the total 40 hours be completed through on-demand sessions.

In some examples, if a student user's tracked on-demand session attendance time for a course has reached a threshold (e.g., a maximum amount of time allowed through on-demand sessions), the online learning system 102 can automatically deny (e.g., may not credit, may ignore, may reject, etc.) any additional class attendance time obtained through on-demand sessions for that course. Similarly, in some examples, if a student user's tracked live session attendance time for a course has not reached a threshold requirement (e.g., a minimum amount of time required through live sessions), the online learning system 102 can notify the student user that the threshold requirement for live sessions has not been met and/or set or maintain the student user's course progress as incomplete, indicating that the student user has not met all requirements such as, in this example, the threshold requirement for live sessions.

In some cases, if a student user's tracked live session attendance time for a course has not reached the threshold requirement (e.g., the minimum amount of time required through live sessions), the online learning system 102 can prevent the student user from obtaining credit for new or additional on-demand session attendance time (and/or reject new or additional on-demand session attendance time) until the threshold requirement for the live session attendance time has been met. In other cases, if a student user's tracked live session attendance time for a course has not reached the threshold requirement (e.g., the minimum amount of time required through live sessions), the online learning system 102 may still allow the student user to obtain credit for new or additional on-demand session attendance time. In some cases, the online learning system 102 may allow the student user to obtain the credit for new or additional on-demand session attendance time until a threshold is met (e.g., until a maximum amount of on-demand session attendance time is reached).

In an illustrative example, a jurisdiction may provide credit for a maximum often hours of on-demand session attendance time for a particular course. As a result, the online learning system 102 may track on-demand session attendance time of a student user up to ten hours of on-demand session attendance time by the student user for that particular course. Once ten hours of on-demand session attendance time has been credited to and/or counted for the student user, the online learning system 102 may reject any additional on-demand session attendance time by that student user for the particular course and/or provide only live session attendance time credit to the student user for that course. In some cases, the online learning system 102 may alert the student user when an on-demand session attendance time threshold has been reached.

The student progress tracker 116 can track student progress through classes and/or a program curriculum. The student progress tracker 116 can be updated by the time tracking process 114 and may store and/or retrieve data (e.g., student objects, course objects, tracking values, scheduling data, etc.) in/from the object data store 106. In some examples, the scheduling process 110 can update a student schedule based on tracked time (e.g., tracked on-demand and live session attendance time, student calendar, etc.) without requiring direct scheduling input from the student user. In some cases, the scheduling process 110 can update a student schedule based on tracked time when a threshold is reached.

The scheduling process 110 may generate and/or update a student schedule of classes/courses based on data from the student progress tracker 116. On-demand classes/courses (e.g., course objects, etc.) can be stored and retrieved from a content store 108 on a content management system (CMS) 104. In some examples, the on-demand classes/courses can be retrieved from the content store 108 in response to a student user request for an on-demand class/course. In some cases, the on-demand classes/courses can be retrieved from the content store 108 via a topic or course object. In some examples, live classes/courses (e.g., real-time class/course content, livestreamed classes/courses, on-demand class/course content accessed while a live instructor of the class/course is available to communicate/interact with the student user) may be stored as class/course sessions in a shared data store with user objects.

The live session process 112 can manage live class/course sessions (e.g., real-time sessions, livestreaming sessions, on-demand sessions with a live instructor available during the session, etc.). The live class/course sessions can include any type of content such as, for example, video content, audio content, text content, image content, etc. In some examples, the live session process 112 can connect an instructor user(s) to one or more student users in a live session. In some cases, the CMS 104 can store (e.g., via content store 108) the live session information (e.g., real-time session information, livestreaming content and/or session information, information from an on-demand session with a live instructor available, etc.). For example, in some cases, the CMS 104 can store a live session start time, a live session end time, information about a live session instructor, instructor attendance/availability information, session activity, session timestamps, session content information, session and class/course associations, session and instructor associations, etc.

In some cases, the live session process 112 can interact with the CMS 104 to manage content (e.g., streams, etc.), provide and/or manage content, etc. Moreover, in some examples, live sessions may include a reference to a topic object (e.g., stored in CMS 104) and timing information for providing the connection between instructor users and respective student users. In some examples, on-demand sessions may similarly include a reference to a topic object. In some cases, the topic object, by being referenced by on-demand sessions and/or live sessions, can serve as a link between tracked on-demand time and tracked live class time in order to reconcile tracked time as further discussed below.

Course content provided to student users (e.g., as livestream content, on-demand content, etc.) may be processed by the time tracking process 114 as discussed above. The time tracking process 114 can verify/confirm physical attendance of a student user to a live or on-demand session based on one or more electronic messages received from the student device 124 associated with the student and/or one or more responses by the student device 124 to one or more electronic messages sent to the student device 124.

In some examples, the student device 124 can periodically (and/or on any other basis such as a randomized basis, based on a triggering event, based on a user request/input, based on a request from the online learning system 102, etc.) ping and/or send to the online learning system 102 (and/or to the time tracking process 114) electronic reachability messages to report and/or verify/confirm physical attendance to the live or on-demand session by the student user associated with the student device 124. The pings and/or electronic reachability messages from the student device 124 can include a timestamp(s), an indication of the class/course associated with the live or on-demand session, a session identifier, activity information, and/or any other information.

Similarly, in some examples, during a live or on-demand session, the time tracking process 114 may periodically (and/or on any other basis such as a randomized basis, based on a triggering event, based on a user request/input, based on a request from the online learning system 102, etc.) ping and/or send electronic reachability messages to each respective student device (e.g., student device 124) to verify/confirm physical attendance to the live or on-demand session by the student user associated with the student device 124. For example, the time tracking process 114 may send, during a live or on-demand session, one or more electronic messages to the student device 124 associated with a student user. The student device 124 can (e.g., if available/present) send one or more responses to the pings and/or electronic reachability messages from the time tracking process 114. A response from the student device 124 can include a timestamp(s), an indication of the class/course associated with the live or on-demand session, a session identifier, and/or any other information.

Based on the response messages received from the student device 124 (if any), the time tracking process 114 can verify activity on the student device 124 and confirm whether the student user associated with the student device 124 is active/present in and/or attending the live or on-demand session. After confirming that the student user associated with the student device 124 is active/present in and/or attending the live or on-demand session, the time tracking process 114 may update the student progress tracker 116 with corresponding credit for the time spent by the student user attending the live or on-demand session. In some cases, if no response messages are received (or below a threshold of expected responses are received) from the student device 124 and/or if activity at the student device 124 is not detected/confirmed for at least a threshold amount of time (e.g., based on responses to pings and/or electronic messages), the time tracking process 114 may notify the student progress tracker 116 so the student progress tracker 116 does not credit the student user for any time that the student user is determined to not have been active/present in and/or in attendance of the live or on-demand session.

As another example, the time tracking process 114 may check activity and/or an activity monitor on the student device 124. If the time tracking process 114 detects activity over a threshold amount of time, the time tracking process 114 may update the student progress tracker 116 with tracked time information. The time tracking process 114 can credit the student user associated with the student device 124 for the time spent attending the live or on-demand session.

In some cases, the time tracking process 114 can track the type of time spent during a session and associate the tracked time spent with the type of time spent. For example, the time tracking process 114 can track live time (e.g., time spent on a live session) and on-demand time (e.g., time spent on an on-demand session) and associate tracked time values with the type of time spent (e.g., live time or on-demand time). In some examples, the time tracking process 114 can label, tag, or annotate time values with an indication of the type of tracked time associated with the time values (e.g., live time or on-demand time).

In some cases, the time tracking process 114 can detect a change in a session from on-demand to live, and vice versa. The time tracking process 114 can track the on-demand time prior to the switch from an on-demand session to a live session, and vice versa. For example, if a student user starts an on-demand session and, during the on-demand session, an instructor becomes available for live communications/interactions with the student user, the time tracking process 114 can detect that the instructor became available for live communications/interactions with the student user. The time tracking process 114 can categorize the time spent prior to the instructor becoming available as on-demand time and the time spent after the instructor became available as live time. The time tracking process 114 can then track the on-demand time and the live time. Thus, the time tracking process 114 can change how a portion of a session is categorized after the session is started (e.g., one portion categorized as on-demand, another portion categorized as live), and can track on-demand time for an on-demand portion of the session and live time for a live portion of the session.

The live communication tools 118 can include tools (e.g., widgets, applications (e.g., voice and/or video calling applications, messaging applications, screen-sharing applications, live broadcasting applications, collaboration applications, real-time chat applications, etc.), platforms, application programming interfaces (APIs) such as WebRTC and the like, etc.) for establishing and managing communications/interactions between instructor users and student users. In some examples, the live communication tools 118 can include controls configured to allow an instructor user to manage and control communications/interactions to and/or from student users.

In some examples, the live communication tools 118 can include controls that allow an instructor user to pause or disable communications/interactions from student users. For example, the live communication tools 118 can include controls that allow an instructor user to pause or disable chats, messaging, calling, voice and/or video messaging, screen sharing, etc., by student users. The controls can also allow the instructor user to resume or enable the communications/interactions from student users. In some cases, the live communication tools 118 can allow an instructor user to pause/disable or resume/enable communications/interactions from all student users in a live session or selected student users in the live session.

The live communication tools 118 can also include tools to allow an instructor user to call on (e.g., request input/comments from) specific student users in a live session. The live communication tools 118 can generate a notification and/or indication to a particular student user that has been called on by the instructor user in order to inform the particular student user that the instructor user expects a certain input/comment/interaction from the student user. In some examples, the live communication tools 118 can allow student users to generate an indication/notification for the instructor user, informing the instructor user that the student user wishes to initiate/submit a communication/interaction with the instructor user and/or other student users in a live session.

For example, the live communication tools 118 can allow a student user to virtually "raise her hand" during the live session to ask a question, answer a question, make or post a comment, share a document/file, share her screen, and/or perform any other interaction and/or communication. The live communication tools 118 can allow an instructor user to pause/disable or resume/enable the ability for all student users or selected student users to generate the indication/notification for the instructor user, such as the virtual hand raising described in the example above.

In some cases, the live communication tools 118 can allow a student to "lower her hand" after raising her hand in order to signal that the instructor (or another student) has answered her question. In some implementations, the live communication tools 118 can include limits on the raising and/or lowering of hands by students. For example, the live communication tools 118 can be configured to limit the number of times a student (and/or all students in a session) can raise and/or lower her hand in order to prevent disruptions and/or malicious behavior, such as spamming the hand raise message repeatedly, which can create disruptions and/or interrupt the flow of a class session. Such limits can be tracked in one or more data structures, such as an array of dictionaries, containing user IDs and hand raise counts (e.g., integers) during class/teaching sessions. The hand raise counts can be incremented for each student (or for all students) whenever the student raises their hand. The live communication tools 118 can prevent further hand raising when a student (or all students) reaches a predetermined limit (e.g., a limit set by an administrator or the instructor). In some cases, the hand raise count can be reset if the instructor later allows for student interactions so students may raise their hands again.

An administrator can use an administrator device 120 to access the online learning system 102 to manage classes/courses, content, student user accounts, instructor user accounts, etc. The administrator device 120 can include a remote terminal such as, for example and without limitation, a laptop computer, desktop computer, mobile device, smart television, smartphone, tablet computer, smart wearable device, and the like. In some cases, an administrator user can use the administrator device 120 to access the online learning system 102 through an administrator interface. In some cases, the administrator user can directly access the online learning system 102 (e.g., without using the administrator device 120).

The administrator user can access the online learning system 102 to add, modify, and/or delete course objects and the like. For example, the administrator user can access (e.g., directly or through the administrator device 120) the CMS 104 and the object data store 106 to add, modify, and/or delete student object, progress objects, and the like. The CMS 104 can store any content and information associated with any class/course offered through the online learning system 102. In some examples, the content store 108 can store class/course materials such as, for example and without limitation, videos, audio materials, presentations, quizzes, tests, projects, documents, images, assignments, schedules, agendas, modules, communications, status information, updates, etc.

In some examples, the CMS 104 can be part of, or implemented by, the online learning system 102. In other examples, the CMS 104 can be separate from the online learning system 102 and/or implemented by one or more separate computing systems. Moreover, in some examples, the data store 106 and content store 108 can both be part of, or implemented by, the CMS 104 and/or the online learning system 102. In other examples, the data store 106 and/or the content store 108 can be separate from the CMS 104 and/or the online learning system 102 and/or implemented by one or more separate computing systems.

The components shown in FIG. 1 with respect to the online learning system 102 are merely illustrative examples provided for explanation purposes. In other examples, the online learning system 102 can include more or less components than those shown in FIG. 1. Thus, while the online learning system 102 are shown to include certain components, one of ordinary skill in the art will appreciate that the online learning system 102 can include more or fewer components than those shown in FIG. 1. For example, the online learning system 102 can include, in some instances, one or more other memory devices (e.g., RAM, ROM, cache, and/or the like), one or more networking interfaces (e.g., wired and/or wireless communications interfaces and the like), one or more display devices, caches, storage devices, and/or other hardware or processing devices that are not shown in FIG. 1. An illustrative example of a computing device and/or hardware components that can be implemented with the online learning system 102 are described below with respect to FIG. 11.

Figure 2:
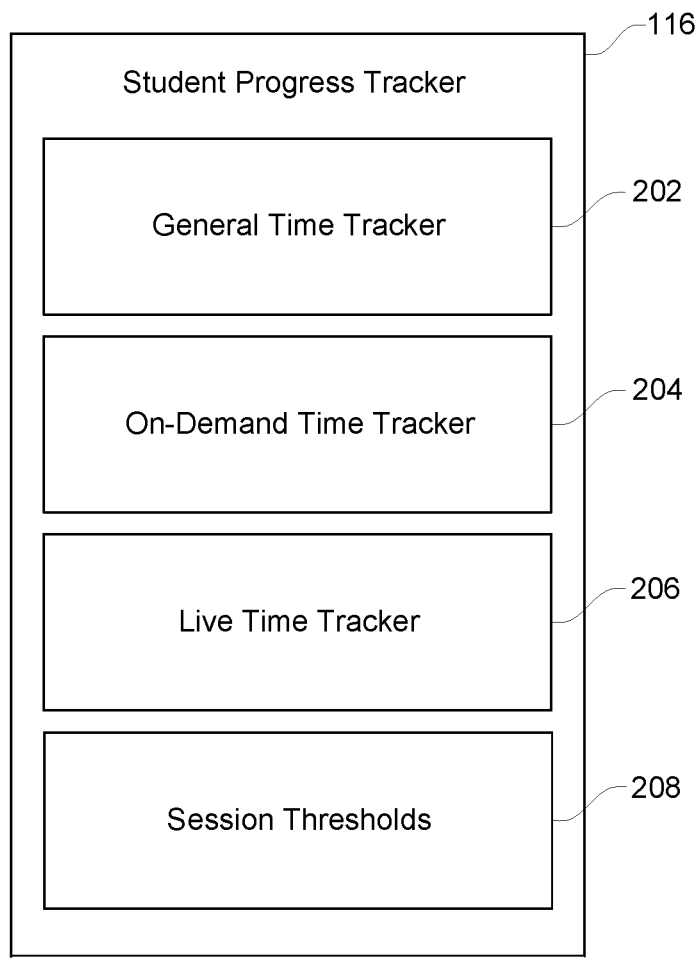
FIG. 2 is a diagram illustrating an example student progress tracker, in accordance with some examples of the present disclosure.

FIG. 2 illustrates an example student progress tracker 116, in accordance with some examples of the present disclosure. Student progress tracker 116 resides in, is hosted by, is implemented by, and/or is part of, online learning system 102 and can track the progress of student users throughout classes/courses.

The student progress tracker 116 can include a general time tracker 202, an on-demand time tracker 204, a live time tracker 206, and session thresholds 208. The general time tracker 202 can track overall time spent by a student user attending classes/courses through the online learning system 102. The on-demand time tracker 204 can track time spent by the student user attending an on-demand session and/or accessing on-demand course content. The live time tracker 206 can track time spent by the student user attending a live session and/or accessing live course content.

The on-demand time tracker 204 and/or the live time tracker 206 can access session thresholds 208. The session thresholds 208 can include on-demand session attendance thresholds and/or live session attendance thresholds. The on-demand time tracker 204 can use the on-demand attendance thresholds from the session thresholds 208 to determine whether on-demand session attendance thresholds have been reached. The live time tracker 206 can use the live attendance thresholds from the session thresholds 208 to determine whether live session attendance thresholds have been reached.

The on-demand session attendance thresholds can include, for example and without limitation, a time threshold indicating a maximum amount of time a student user may participate in on-demand sessions for a particular class/course and/or a maximum amount of time the student user can receive credit for time spent in on-demand sessions for the particular class/course. The live session attendance thresholds can include, for example and without limitation, a time threshold indicating a minimum amount of time a student user must attend and/or participate in live sessions for a particular class/course. In some cases, the session thresholds 208 can include other information and/or thresholds. For example, the session thresholds 208 can include content thresholds (e.g., limits or requirements for the amount of live and/or on-demand content accessed, reviewed, completed, etc.), user activity thresholds, etc.

In some examples, the student progress tracker 116 can transmit data to downstream systems and/or processes of the online learning system 102. For example, when the on-demand time tracker 204 determines a threshold amount of time has or has not been spent by the student user accessing on-demand course content, the student progress tracker 116 may interface with a downstream system to alert the student user, an instructor user, and/or an administrator user. As another example, when the live time tracker 206 determines a threshold amount of time has or has not been spent by the student user accessing live course content, the student progress tracker 116 may interface with a downstream system to alert the student user, an instructor user, and/or an administrator user.

Figure 3:
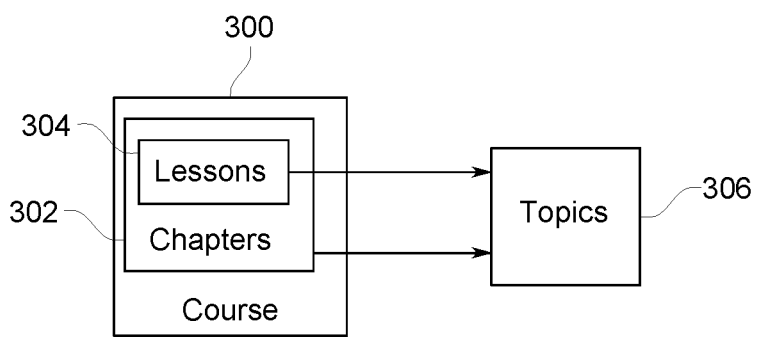
FIG. 3 is a diagram illustrating an example course data object, in accordance with some examples of the present disclosure.

FIG. 3 illustrates an example course data object, in accordance with some examples of the present disclosure. In one illustrative example, course 300 contains information about a course, such as information about chapters and lessons. In some examples, the courses 300 can contain other information such as, for example and without limitation, instructions, guides, tests, manuals, course materials, course preferences, and/or any other course content. In some cases, the online learning system 102 can send information from the course 300 to course topic objects.

The courses 300 can include one or more data objects, such as chapter data objects, lesson data objects, etc. These data objects can be related, as each chapter 302 may include one or more lessons 304. In some examples, a particular lesson can be accessible by iterating from a respective course through a respective chapter 302 and/or directly through a linkage to an outside topic data object, such as topic 306 (which may also provide navigation to other lessons and one or more chapters). Topic 306 may also be referenced by a live class and, for example, may be used to categorize the live class or the like. In some examples, lessons 304 may include video (e.g., recorded lectures, etc.), audio, text content, and/or any other form of digital content. In some examples, lessons 304 may include interactive content such as quizzes, surveys, tests, etc. In some examples, lessons 304 may include supplement content such as slide decks, documents, PDFs, images, embedded content, video, etc.

Figure 4:
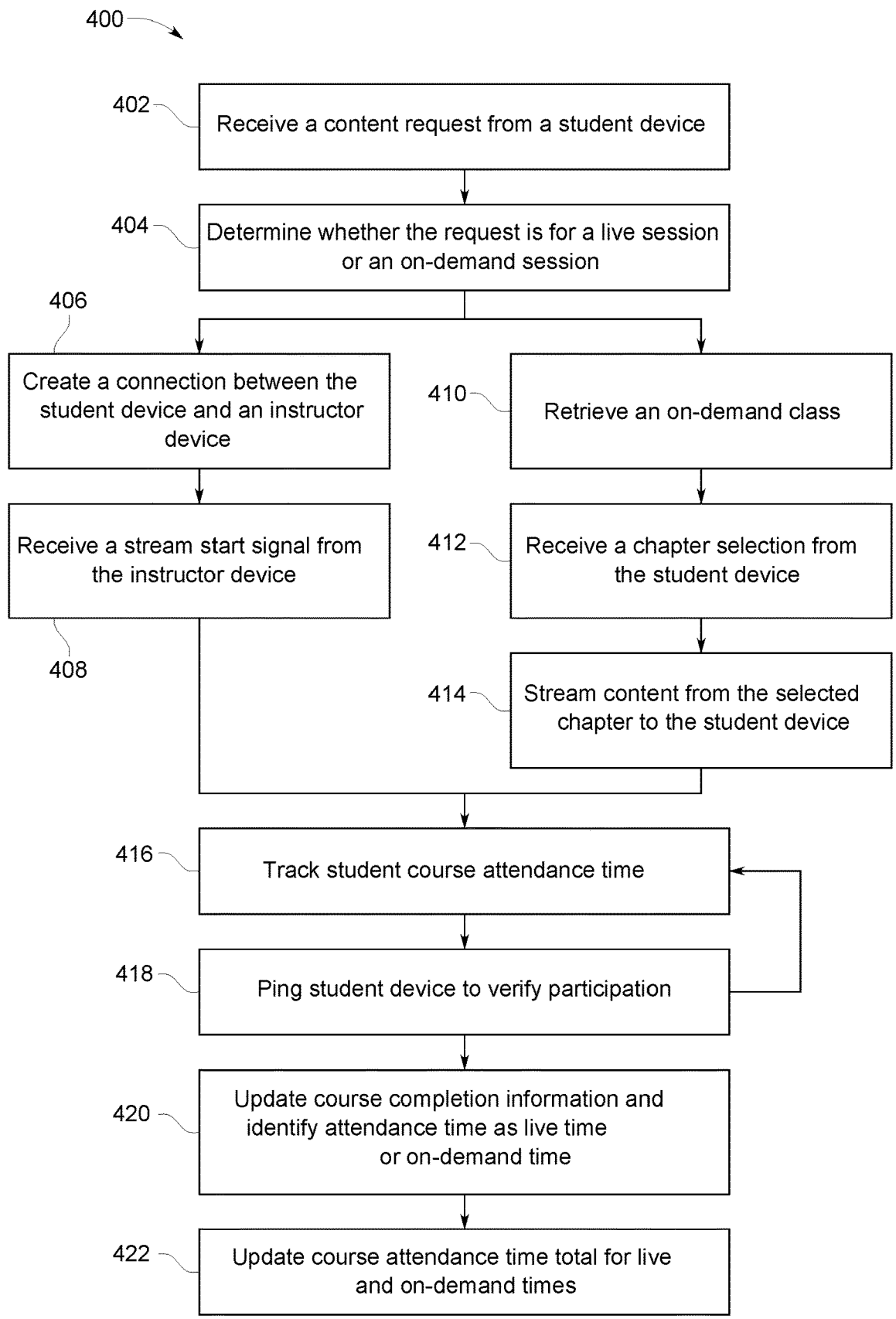
FIG. 4 is a flowchart illustrating an example process for delivering course content, in accordance with some examples of the present disclosure.

FIG. 4 is a flowchart illustrating an example process 400 for delivering course content, in accordance with some examples of the present disclosure. At block 402, the process 400 can include receiving, from a student device 124, a content request by the online learning system 102. The content request may involve selecting or joining a topic, logging into a live or on-demand class or session, downloading course materials, a request to access content, etc.

At block 404, the process 400 can include determining whether the request is for a live session (e.g., a live class) or an on-demand session (e.g., an on-demand class). In some examples, the online learning system 102 can determine the session type (e.g., live or on-demand) based on information included in the content request, contextual information (e.g., a calling service identifier, a user identifier, type of access request, content session information, etc.), etc. In some examples, the online learning system 102 can determine the session type based on whether a live instructor is available during the session. For example, the online learning system 102 can determine the session is a live session if a live instructor is available during the session or an on-demand session if a live instructor is not available during the session.

If the content request is for a live session, at block 406 the process 400 can include creating a connection between the student device 124 and the instructor device 122. In some examples, the connection can include a video, audio, and/or multimedia stream from the instructor device 122 to the student device 124. In some examples, the connection can include a video stream to the student device 124 and to other student devices associated with other student users participating in the live session.

At block 408, the process 400 can include receiving a stream start signal from the instructor device 122. The stream start signal may be generated by a manual toggle from the instructor user to indicate a class start, an automatic trigger at a certain time, upon the instructor user connecting to a class session or access a class content or portal, and/or based on any other triggering event.

If the content request is for an on-demand session, at block 410, the process 400 can include retrieving a respective on-demand class. The on-demand class can include any class content. In some examples, the on-demand class includes one or more chapters, lessons, exercises, tests/quizzes, presentations, and/or any other class content.

At block 412, the process 400 can include receiving a chapter (or other content, section, etc.) selection from the student user (e.g., via the student device 124). At block 414, the process 400 can include providing the selected chapter and associated content to the student device 124 (e.g., from online learning system 102, instructor device 122, etc.). In some examples, the selected chapter and associated content can be served to the student user's device via the online learning system 102.

In some cases, the selected chapter and associated content can be streamed to the student user's device via the online learning system 102 (e.g., from one or more media streaming servers, software containers, virtual machines, content delivery systems, and/or any other component of the online learning system 102) or via the instructor device 122 via a peer-to-peer connection or streaming media server. In other examples, the selected chapter and associated content can be streamed from the instructor device 122 to the online learning system 102 and then from the online learning system 102 to the student user's device. In some cases, the selected chapter and associated content can be streamed to the student user's device using one or more streaming and/or networking protocols, standards, and/or APIs such as, for example and without limitation, Hypertext Transfer Protocol (HTTP), Hypertext Transfer Protocol Secure (HTTPS), Transmission Control Protocol (TCP), Real-Time Transport Control Protocol (RTCP), IP multicast, video coding standards, Websocket, HTTP Live Streaming (HLS), Web Real-Time Communication (WebRTC), Real-Time Streaming Protocol (RTSP), Real-Time Transport Protocol (RTP), peer-to-peer protocols, and/or any other networking protocols and/or standards.

At block 416, the process 400 can include tracking student attendance time throughout the live and/or on-demand session. Tracking may be performed server side (e.g., by the time tracking process 114, etc.) and/or client side (e.g., by the student device 124). At block 418, the process 400 can include pining the student device 124 at random or predefined intervals to verify student participation. In some examples, the time is tracked when the ping indicates student participation. For example, the online learning system 102 can ping the student device 124 to measure, detect, and/or monitor student access, participation, activity, etc., and track time for the student. As another example, the student device 124 can ping the online learning system 102 to report participation in the session by the student user.

At block 420, the process 400 can include calculating and/or updating course completion information for a respective course, based on the tracked time. The tracked time can be identified as live time, on-demand time, or both. The time type (e.g., live or on-demand) can be based on a determination made by the online learning system 102. For example, the online learning system 102 can determine that a time value should be identified as live time when the online learning system 102 determines that a live instructor is/was available during the session, and can determine that a time value should be identified as on-demand time when the online learning system 102 determines that a live instructor is/was not available during the session.

In some examples, the tracked time can be labeled as live time or on-demand time. Moreover, the labeled tracked time can be reconciled by the student progress tracker 116 to determine an overall progress for the student user.

In some aspects, reconciling labeled tracked time can include adding live time and on-demand time or generating a weighted sum of live time and on-demand time. In some examples, reconciling labeled tracked time can include accounting for live time and on-demand time that covered overlapping material. For instance, suppose a student user attended a live session covering a certain topic, and subsequently reviewed the material in an on-demand session. In this example, reconciling labeled tracked time can involve refraining from counting both of the live and on-demand times when they cover the same material. Instead, the total tracked time may only count for the non-overlapping time from the live and on-demand times and may count only a single instance of the live or on-demand time corresponding to the same material. In other examples, when reconciled, tracked time can be allowed to credit or include overlapping time from live and on-demand times.

At block 422, the process 400 can include updating course attendance time totals of the student user (e.g., stored within a student object) for live attendance and/or on-demand attendance. These objects can be stored in object data store 106 for future consumption by the online learning system 102 or review by an administrator. Moreover, the course attendance time totals can be maintained and used to manage course/program progress, scheduling information, certification information, completion information, registration information, course materials/content, course requirements, etc.

FIGS. 5A-E illustrate example user interfaces displaying a dashboard, live class schedule, on-demand class and associated chapters, chapter lessons, and an upcoming schedule, in accordance with some examples of the present disclosure. In some examples, the user interface can be served or provided by the online learning system 102 and displayed by the student device 124, as described with respect to FIG. 1. Through the user interfaces, users in the system can access respective information, access various system features and/or functionalities, access (e.g., view, download, stream, etc.) content, collaborate, upload content, communicate/interact with other users, etc.

Figure 5A:
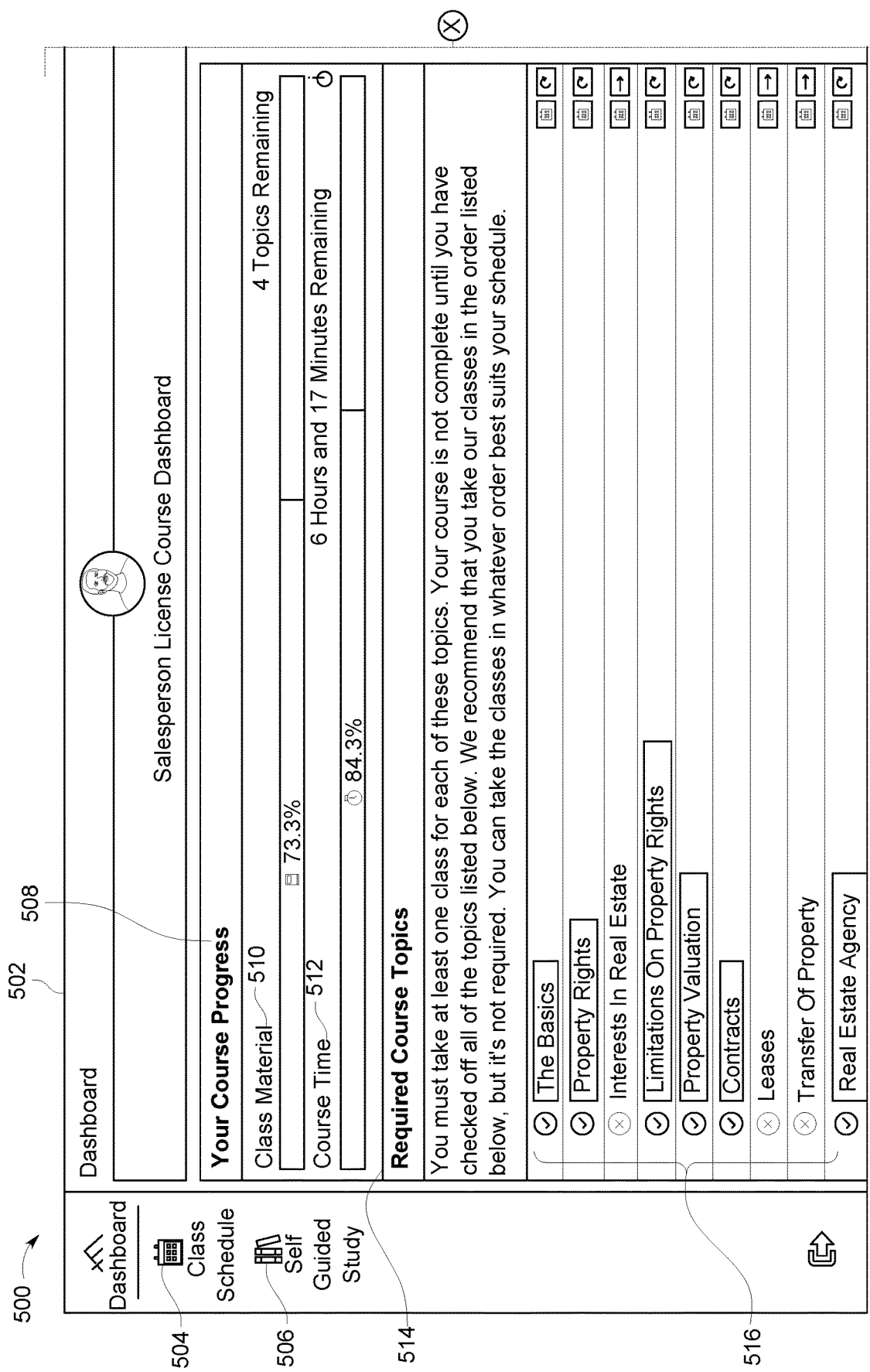
FIG. 5A illustrates an example user interface displaying an example dashboard associated with an online learning system, in accordance with some examples of the present disclosure.

FIG. 5A depicts a dashboard view 502 of an example user interface 500. A student can use the user interface 500 to access a dashboard associated with the online learning system 102 (and associated content and functionalities). In this example, the dashboard view 502 depicts a dashboard where a student can review course progress information (e.g., retrieved from a student object, etc.). The user interface 500 can display the course progress information in any format or configuration. In the example shown in FIG. 5A, the course progress information is displayed in a summary view and as line items in a list view.

On the sidebar, a class schedule 504 can display a schedule of when on-demand and/or live classes are available for a given course, such as a salesperson license course. Self-guided study view 506 can display a schedule, plan, and/or content for self-guided study through the course. In the example shown in FIG. 5A, the user interface 500 is shown and described herein with respect to a salesperson license course. However, the salesperson license course is merely provided as a non-limiting example for explanation purposes. As previously noted, one of ordinary skill in the art will recognize that the systems and techniques described herein can apply to, and/or be implemented in, a variety of other contexts and/or applications, such as other training programs, educational programs, courses, materials, structured programs, certificate programs, projects, etc.

Course progress 508 contains information tracking the progress of the student user through the course, such as the salesperson license course. Class material 510 tracks a progression through class material including, for example, chapters read, tests taken, lessons completed, etc. Course time 512 tracks temporal requirements, such as hours needed in real-world experiences to obtain certification.

Required course topics 514 lists topics 516 a student user needs to study to complete the requirements of the offered course.

Platform access hours 518 tracks the amount of time that a student user has spent utilizing the online learning system 102. Feedback 520 elicits and/or enables feedback from the student user on their course experience. Course materials 522 displays relevant course materials, such as study guides, syllabi, examples, tests, videos, reference materials, and/or other documents and/or materials.

Figure 5B:
FIG. 5B illustrates an example live class schedule view of an example user interface, in accordance with some examples of the present disclosure.

FIG. 5B depicts a tailored live class schedule view 530 of an example user interface 525. The live class schedule view 530 can provide one or more schedules for one or more live online classes (e.g., upcoming and/or in session) and any associated information. In this example, the live class schedule view 530 can include class topics section 532 and live classes modules 534A-N. Class topics section 532 lists one or more class topics for the present course. In some examples, class topics section 532 can list all class topics and/or unattended topics. Live classes modules 534A-N are associated with specific topics or class sessions and can enable access to the specific classes, associated content, materials, and/or information.

In the example shown in FIG. 5B, the live class session modules 534A-N display times and information for specific live classes (e.g., upcoming and/or in session). The information can include, for example, the time of the class, the length or duration of the class, the class topic(s), the class instructor(s), a class description, and/or any other class details and/or materials.

In some examples, class materials can be accessed through this interface. In some cases, a user can join or schedule to join one or more classes through the user interface 525. For example, a user can select or click on a class from the live classes modules 534A-N to join or schedule to join that class. Moreover, in some cases, a user can access additional class information and/or content through the live classes modules 534A-N. For example, a user can select a live class module (e.g., 534A, . . . , 534N) to access additional information, materials, and/or functionalities associated with a class corresponding to that live class module.

Figure 5C:
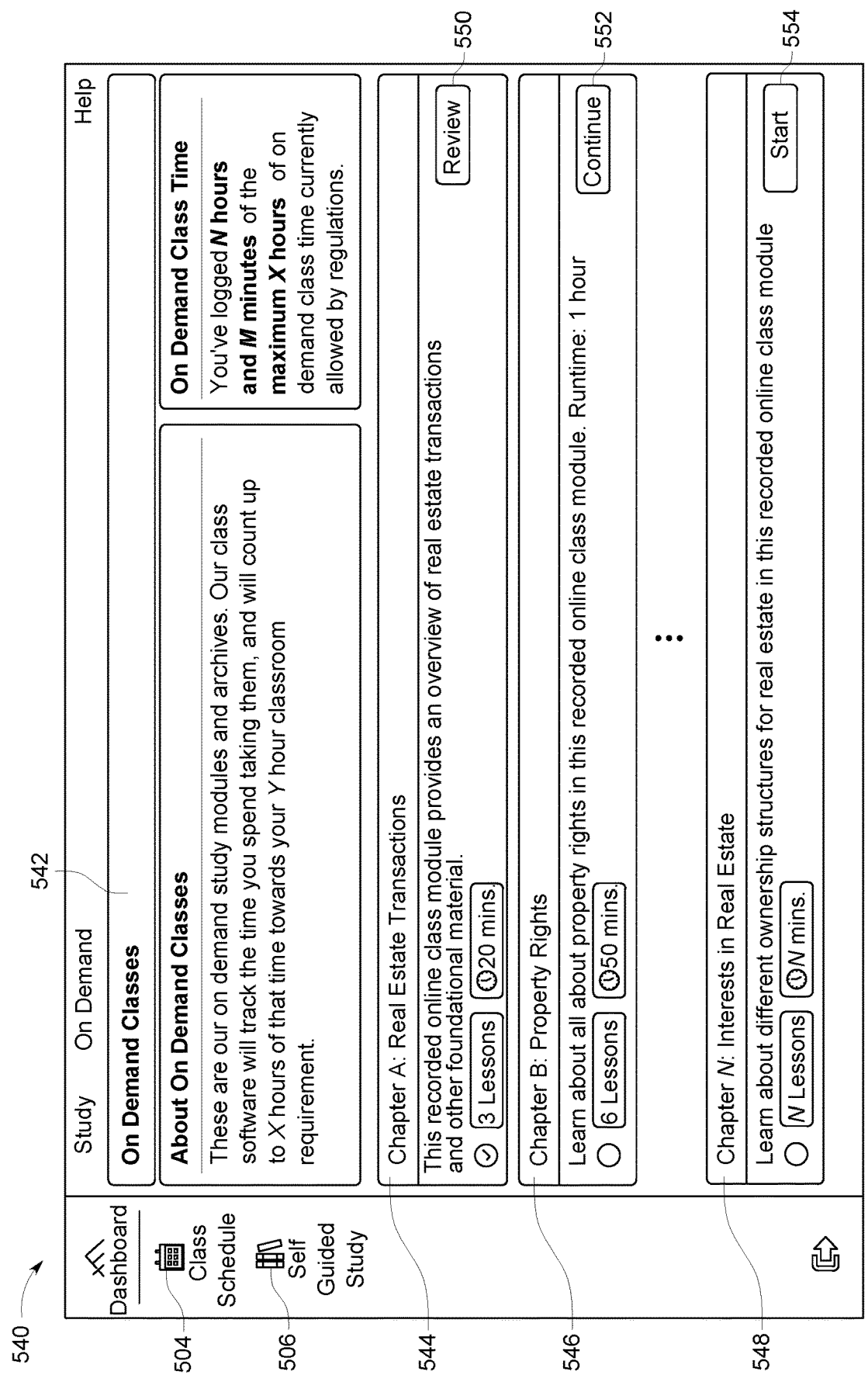
FIG. 5C illustrates an example self-guided study view of an example user interface, in accordance with some examples of the present disclosure.

FIG. 5C depicts a self-guided study view 506 of an example user interface 540. This view displays an on-demand classes module 542 which, for instance, can include recorded lectures, self-paced materials, pre-packaged content, etc. The on-demand classes in the on-demand classes module 542 can have specific parameters, variables, settings, etc., configured through the online learning system 102 (e.g., through an administrator and/or settings component, system, module, object, etc.). For example, an administrator can define class requirements and/or settings for one or more on demand classes through the online learning system 102.

Non-limiting examples of class requirements and/or settings can include a total time requirement for a class (e.g., an amount of time to complete the class and/or obtain credit for the class); a maximum amount of time or percentage of time, from the total time requirement for the class, that a user can complete through an on demand and/or live format/usage (e.g., up to n hours from the total hours requirement for class x can be completed through the on demand class format and up to m hours from the total hours requirement for class x can be completed through the live class format); a time period-required for completing the total time requirement for the class; a time period for completing a maximum amount of time (from the total time requirement for the class) that a user is allowed to complete through an on demand and/or live class format; a time period in which a user can access the on demand and/or live class format; a time period from which a user can apply on demand class time and/or live class time towards the total time requirement for a class; one or more pre-requisite topics and/or classes/courses; completing a required set of lessons, materials, and/or topics; completing an activity or activities (e.g., a quiz, a project, etc.); and/or any other class requirements, limits, settings, etc.

In some examples, an administrator can remove and/or edit limits, requirements, and/or settings for a class through the online learning system 102. For example, an administrator can remove an on-demand class time and/or live class time limit set, which provides a maximum amount of time that a user can complete through an on demand and/or live class format. As another example, an administrator can update a class requirement previously set (for example if a jurisdiction requirement changes).

An on-demand classes module 542 can include chapter modules 544, 546, and 548 where the user can access content and/or functionalities (e.g., start a chapter, review a chapter, continue a started chapter, etc.) for specific chapters. For example, chapter module 544 includes a review interface element 550 which can allow a user to review material for the chapter associated with the chapter module 544. The chapter in this example is a completed chapter. Thus, the user can review information about the completed chapter from the review interface element 550 in the chapter module 544. The checkmark next to the lessons box in the chapter module 544 indicates that all lessons have been completed, as well as the number of lessons within chapter associated with the chapter module 544. Lessons may contain embedded multimedia content, text, images, attachments for the user to download (e.g., PDFs, slideshows, spreadsheets, images, documents, videos, files, etc.), videos, audio, quizzes, and/or any other content.

In some examples, the class timer in chapter module 544 can be minimized or maximized by the user and can display the amount of time progress the user has made for the chapter in chapter module 544 and/or the length in time of the chapter in chapter module 544. In some examples, the class timer can turn red to indicate when the student has exhausted their allotted asynchronous course time, assuming there is a limit set on asynchronous time. If there is no limit, it would not change.

Chapter module 546 includes a continue interface element 552 which can allow a user to continue an ongoing or a previously-started chapter associated with the chapter module 546. Chapter module 548 includes a start interface element 554 which can allow a user to begin a new chapter associated with chapter module 548.

Figure 5D:
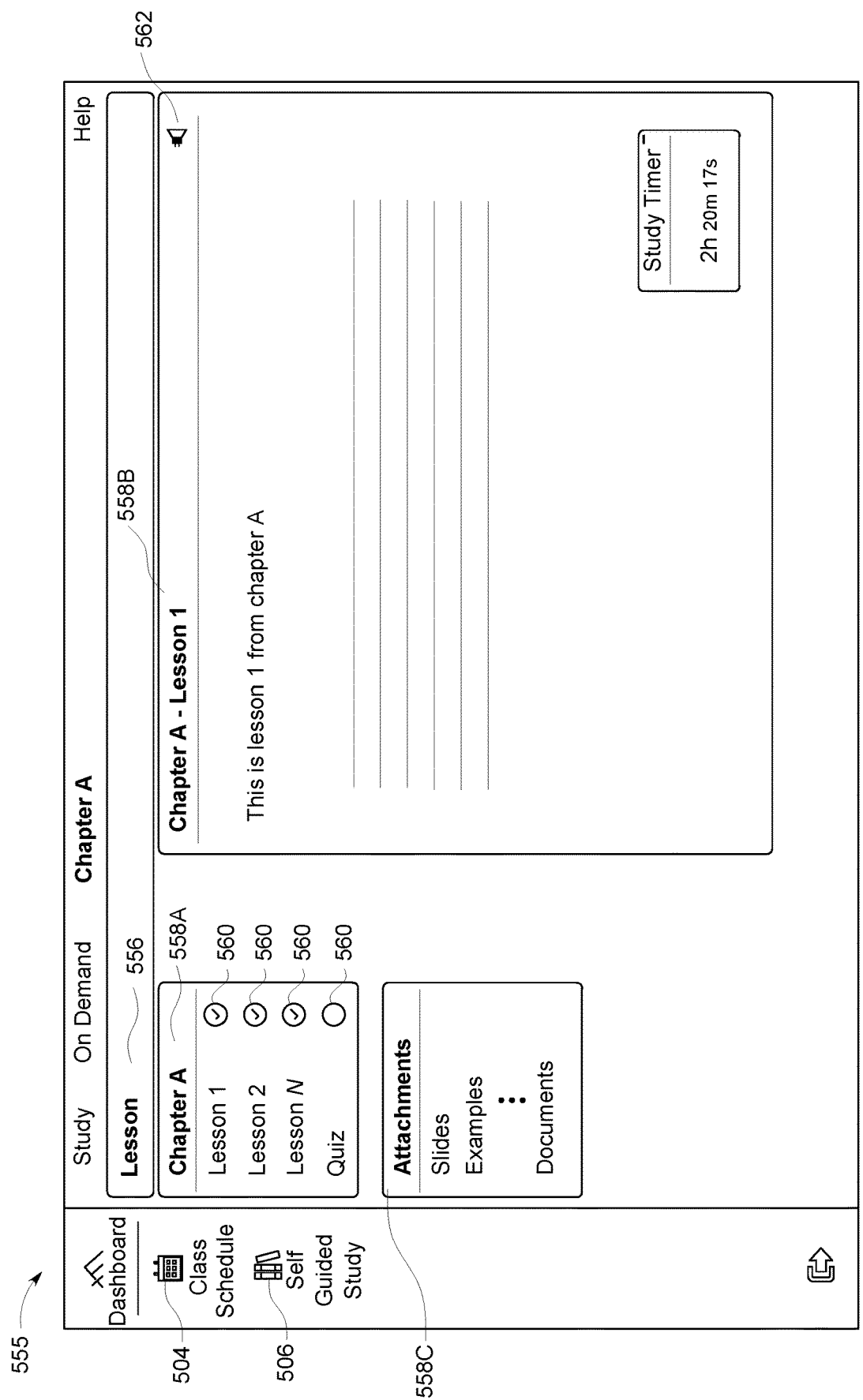
FIG. 5D illustrates another example self-guided study view of an example user interface, in accordance with some examples of the present disclosure.

FIG. 5D depicts a self-guided study view of an example user interface 555. This view displays a lesson view 556 from the chapter module 544 shown in FIG. 5C. The lesson view 556 can include a chapter details section 558A which can display content items associated with a chapter, such as, for example, lessons and quizzes. In some examples, the content items displayed in the chapter details section 558A can include indicators 560 which can indicate whether associated content items have been completed and/or accessed (e.g., via checkmarks or any other indicators) or any other status/activity information.

The lesson view 556 can also include a lesson section 558B that can display the content (e.g., the lesson) from a particular lesson of a chapter associated with the lesson view 556. In some examples, the lesson content can include video content, audio content, text content, and/or another form of content. In some examples, the lesson section 558B can include an audio element 562 which can enable a user to select certain audio preferences such as, for example, speaker output, text-to-speech output, etc. In some cases, the audio element 562 provides a text-to-speech option to the user so text from the lesson can be processed and/or output as audio for the user. For example, when the user selects the audio element 562, the system can read the lesson's content aloud to the student (e.g., by outputting audio corresponding to the lesson's content). In some cases, the audio generated may not be pre-recorded, but generated automatically and/or on-demand based on the content uploaded to the CMS 104 for the lesson.

In some examples, the lesson section 558B can include a timer that displays an amount of time that has lapsed since the user started the lesson, an amount of time that the user has completed for the lesson, and/or a total amount of time that the user has spent in the entire course. In some cases, the lesson view 556 can also include an attachments section 558C that displays attachments associated with the chapter and/or lesson and available for viewing and/or download.

In some cases, the user interface 555 can enable interactions (e.g., voice, video, chat/messaging, screen sharing, etc.) with an instructor if an instructor is online and available (and/or becomes available online). For example, if an instructor becomes available during the self-study on-demand session, the user interface 555 can display an indication (not shown), such as instructor status 612 shown in FIGS. 6A and 6B, notifying the student that the instructor is online and available to interact with the student. In some examples, when the instructor is online and available, the user interface 555 can present an interface element (not shown) that allows the student to interact with the instructor. For example, the user interface 555 can present the chat interface object 630 shown in FIG. 6B. If the instructor becomes available during the on-demand session, the time spent by the student while the instructor is online and available can be tracked as live time as further described herein. Thus, the portion of the session during which the instructor is online and available to interact with the student can be counted as a live session.

Figure 5E:
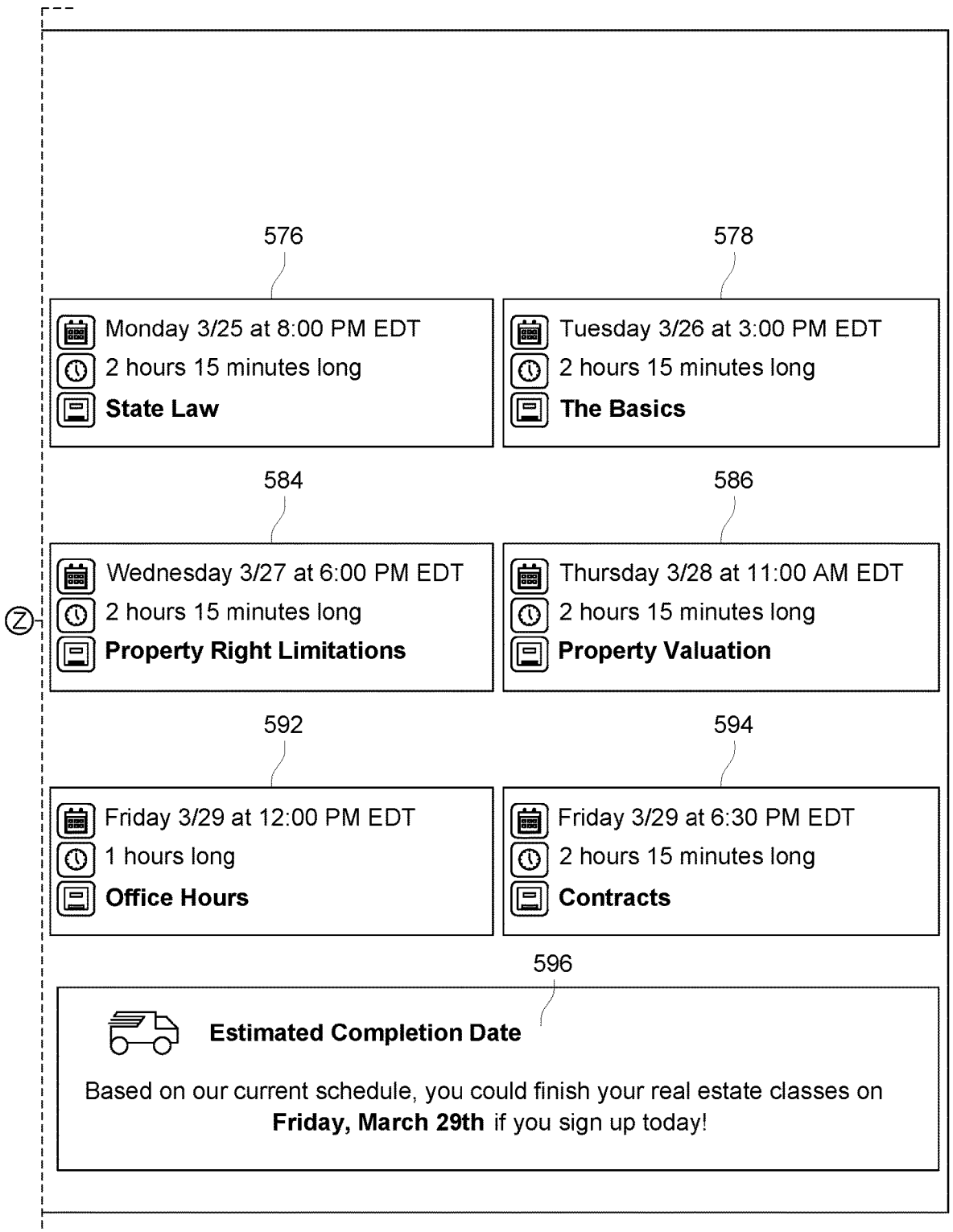
FIG. 5E illustrates an example class schedule on an example user interface showing upcoming live classes, in accordance with some examples of the present disclosure.

FIG. 5E depicts an example class schedule 570 on an example user interface 565 showing upcoming live classes 572-594. A student user can review and access upcoming live classes through this interface. In some cases, the student user may not need to be logged in. For example, the interface can be open to or published for public users and/or have unrestricted permissions. In some examples, the user interface 565 can additionally or alternatively show upcoming live-interaction sessions (e.g., on-demand sessions that have an instructor available for interaction) separate from the live-stream sessions (e.g., via toggle, filter, preference setting, command, interface control, or any other means) or show the live-interaction sessions commingled with live-stream sessions in one master schedule.

In other examples, the student user can access the user interface 565 from a student user account, and one or more aspects of the user interface 565 can be tailored to the student user account. For example, the user interface 565 can display upcoming classes along with student-specific scheduling information, completed prerequisites, preferences, related classes, completed classes, class enrollment information, etc.

In some cases, the user interface 565 can include a predictive module 596 which can calculate a course schedule and/or predict a completion date for a program. In some examples, the predictive module 596 can predict an amount of time and/or a date estimated for the user being able or expected to complete a program. The online learning system 102 can calculate a course schedule(s) and/or predicted completion date(s) for one or more programs and provide such information in the predictive module 596.

In some cases, the online learning system 102 can calculate a course schedule(s) and/or associated predicted completion date(s) or range of completion dates (e.g., minimum and maximum completion dates) for one or more programs based on available courses/classes, total and/or pending course/class requirements (e.g., total time requirements, on demand class time requirements and/or limits, live class time requirements and/or limits, completion time frame requirements and/or limits, etc.), student schedule and/or availability information, course/class schedules, student progress tracked and/or accepted/credited, preferences, rules/criteria, one or more general calendars (e.g., to take into account holidays, weekends, semesters, seasons, etc.), a history (or statistics) of student progress and/or a student progress rate (e.g., a pace) associated with the student and/or a group of students (e.g., an average progress rate calculated based on multiple students), and/or any other progress or schedule-related information. In some examples, the online learning system 102 can calculate multiple schedules and/or associated completion dates to provide multiple options or alternatives to the student.

Figure 6A:
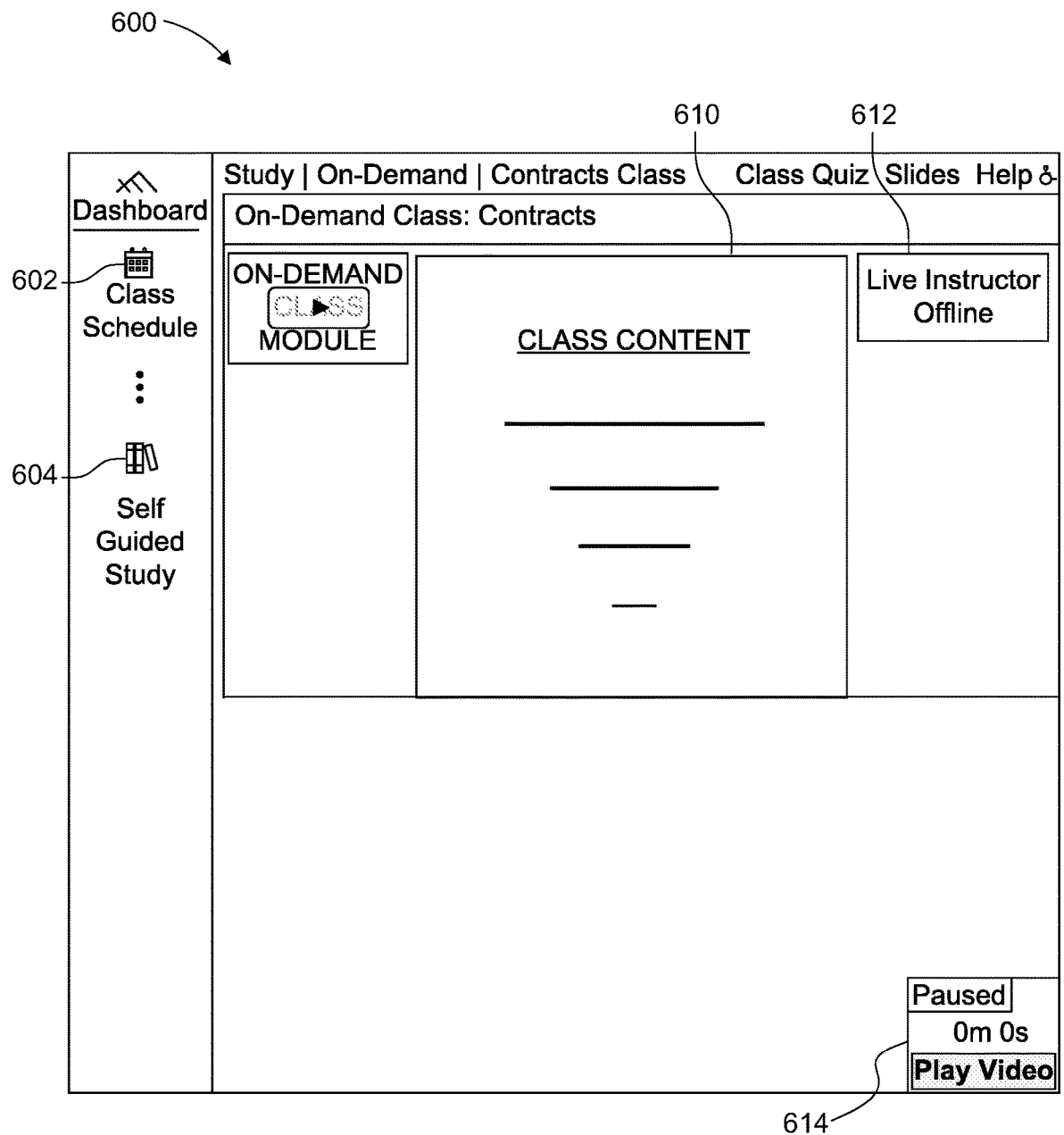
FIG. 6A illustrates an example user interface presenting an example on-demand session, in accordance with some examples of the present disclosure.

FIG. 6A illustrates an example user interface 600 presenting an example on-demand session. The on-demand session corresponds to an example on-demand class hosted by the online learning system 102 and accessed by a student user from the student device 124. In this example, the user interface 600 includes a class schedule interface element 602 where a user (e.g., the student user) can access class schedule information, and a self-guided study interface element 604 where the user can access self-study class materials.

The user interface 600 includes a presentation section 610 where class content can be presented for the user (e.g., the student). The class content can include any type of content such as, for example and without limitation, a video, audio content, a presentation, a document, an image, text, interactive content, and/or any other type of content and/or combination thereof.

The user interface 600 can include an instructor status 612 indicating whether a live instructor is available (e.g., online) or unavailable (e.g., offline). In this example, the instructor status 612 indicates that a live instructor is not available (e.g., is offline). Because the live instructor is not available, the online learning system 102 can classify the session associated with the class presented in the user interface 600 as an on-demand session. The online learning system 102 can track the time spent by the student user in the on-demand session and store the tracked time value for the on-demand session. The online learning system 102 can identify or label the tracked time value as on-demand time.

If the live instructor subsequently becomes available, the instructor status 612 can change to indicate that the live instructor is available (online). When the instructor status 612 changes to available, the online learning system 102 can switch classification of the session from an on-demand session to a live session. The online learning system 102 can track the time spent by the student user in the live session and store the tracked time spent for the live session along with the tracked time spent for the on-demand session (e.g., before the session changed from on-demand to live). The online learning system 102 can identify or label the tracked time value for the on-demand session as on-demand time and the tracked time for the live session as live time. If the live instructor never becomes available during the session, the session remains classified as an on-demand session and the tracked time is identified as on-demand time.

In some examples, to track the time spent by the student user in the session, the student device 124 can periodically (or on any other basis) ping the online learning system 102 and/or send electronic messages to the online learning system 102. In other examples, to track the time spent by the student user in the session, the online learning system 102 can additionally or alternatively ping (periodically or on any other basis) the student device 124 or send (periodically or on any other basis) electronic messages to the student device 124. The online learning system 102 can receive one or more responses (if any) from the student device 124, which the online learning system 102 can use to track the time spent by the student user in the on-demand session.

In some examples, aping and/or electronic message sent by the student device 124 to the online learning system 102 (and/or a response to a ping and/or electronic message sent by the online learning system 102) can include a timestamp indicating the time of activity associated with the ping and/or electronic message, a time-duration value (e.g., an integer value of time spent in the lesson by the student since the last ping and/or electronic message), and/or information about the class associated with the session, such as information identifying the class. In some cases, the time of activity can indicate the progress of the student user within the session (e.g., what material, chapter, lesson, and/or class portion the student user is viewing). In some examples, the ping and/or electronic message (and/or a response to a ping and/or electronic message sent by the online learning system 102) can include additional information such as, for example and without limitation, a session identifier, a user identifier, a device identifier, user activity information, etc.

The information from the ping and/or electronic message (and/or from a response to a ping and/or electronic message sent by the online learning system 102) can indicate that the student user is participating in the on-demand session, what class is associated with the on-demand session, how much the student user has progressed during the on-demand session and associated class, what material or class portions the student user has completed during the on-demand session, what is the current material or class portion being accessed/presented in the on-demand session, and/or any other state, session and/or class information. Moreover, the online learning system 102 can use the information from the ping and/or electronic message (and/or from a response to a ping and/or electronic message sent by the online learning system 102) to track the time spent in the session.

In some examples, the user interface 600 can include a content state element 614 indicating the status of content presented in the presentation section 610. For example, if the class content includes a video or audio, the content state element 614 can indicate whether the video/audio is started, playing, paused, stopped, completed, etc. In some examples, the content state element 614 can also indicate a playback time for the video/audio. In some cases, the content state element 614 can include one or more controls for the class content. For example, the content state element 614 can include a control for playing/starting, pausing or stopping, forwarding, rewinding, etc., the class content (e.g., a video, audio, presentation slides, content pages, an animation, etc.).

Figure 6B:
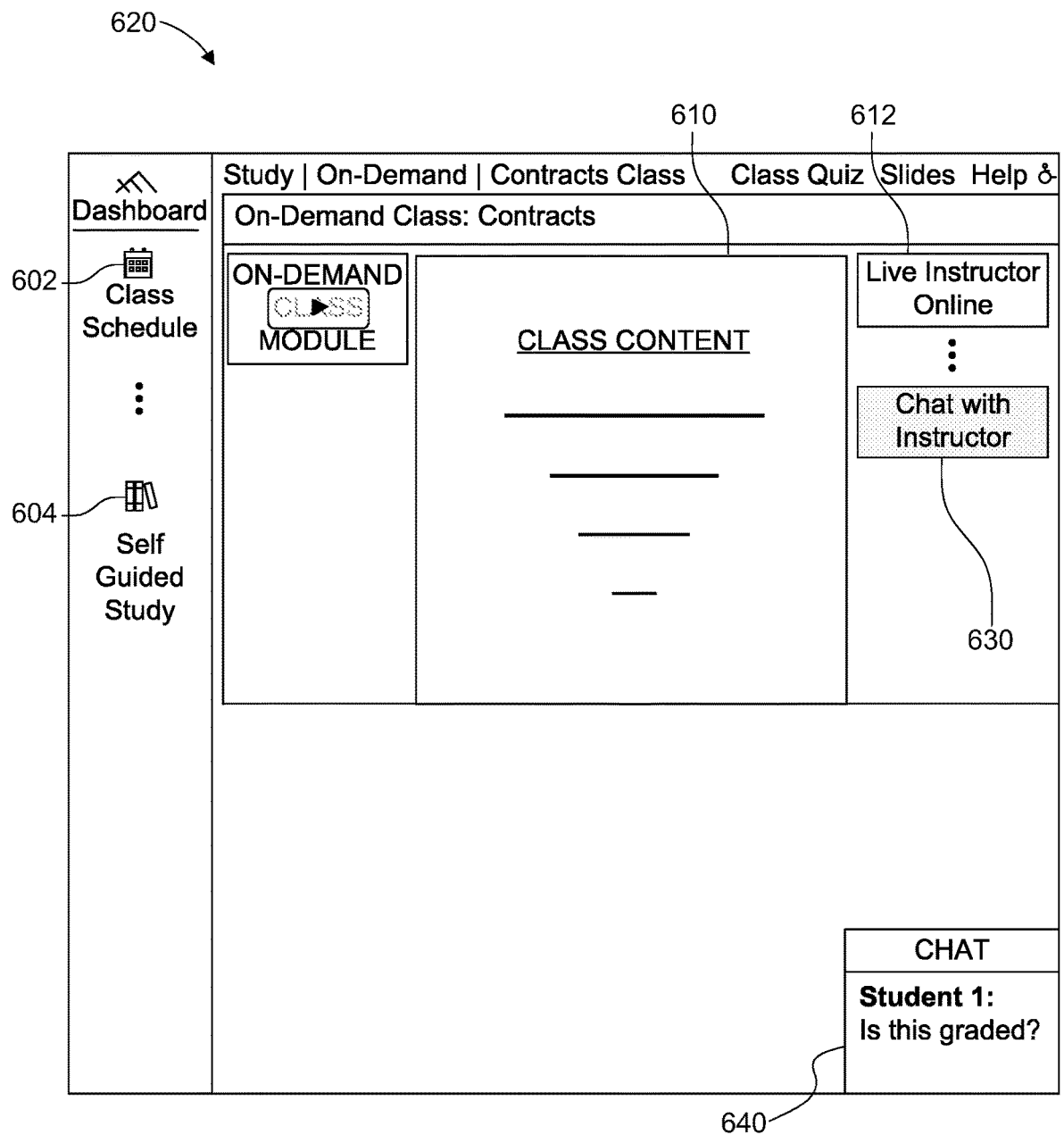
FIG. 6B illustrates an example user interface presenting an example live session, in accordance with some examples of the present disclosure.

FIG. 6B illustrates an example user interface 620 presenting an example live session. In some examples, the user interface 620 can be displayed when the on-demand session displayed by the user interface 600 shown in FIG. 6A changes to a live session. The on-demand session can change to a live session when an instructor user becomes available (e.g., online) during the session. In other examples, the user interface 620 can be displayed when a live session is started (e.g., by the instructor user) or scheduled to start.

As shown in FIG. 6B, the instructor status 612 indicates that a live instructor is online (e.g., available). Thus, the session displayed in user interface 620 is classified by the system as a live session. The user interface 620 can include a chat interface object 630 that the student user can select to initiate a chat with the instructor user. In some examples, when the student user selects the chat interface object 630, the user interface 620 can display the chat interface 640 or a separate chat between the student user and the instructor user (e.g., a sidebar).

The chat interface 640 can allow the student user to post chat messages for the instructor user. In some examples, the messages posted by the student user in the chat interface 640 are visible only by the student user and the instructor user. In other examples, the messages posted by the student user in the chat interface 640 are visible by the student user, the instructor user, and all other student users in the live session. In other examples, the messages posted by the student user in the chat interface 640 are visible by the student user, the instructor user, and one or more selected student users in the live session.

The chat interface object 630 and the chat interface 640 shown in FIG. 6B are merely illustrative examples of a communication/interaction tool that can be implemented with the user interface 620. One of ordinary skill in the art will recognize that, in other examples, the user interface 620 can include other communication/interaction tools in addition to or in lieu of the chat interface object 630 and the chat interface 640. Non-limiting examples of other communication/interaction tools include screen sharing tools, voice messaging or calling/conferencing tools, video messaging or calling/conferencing tools, instant messaging tools, collaboration tools, and/or any other communication/interaction tools.

Figure 7A:
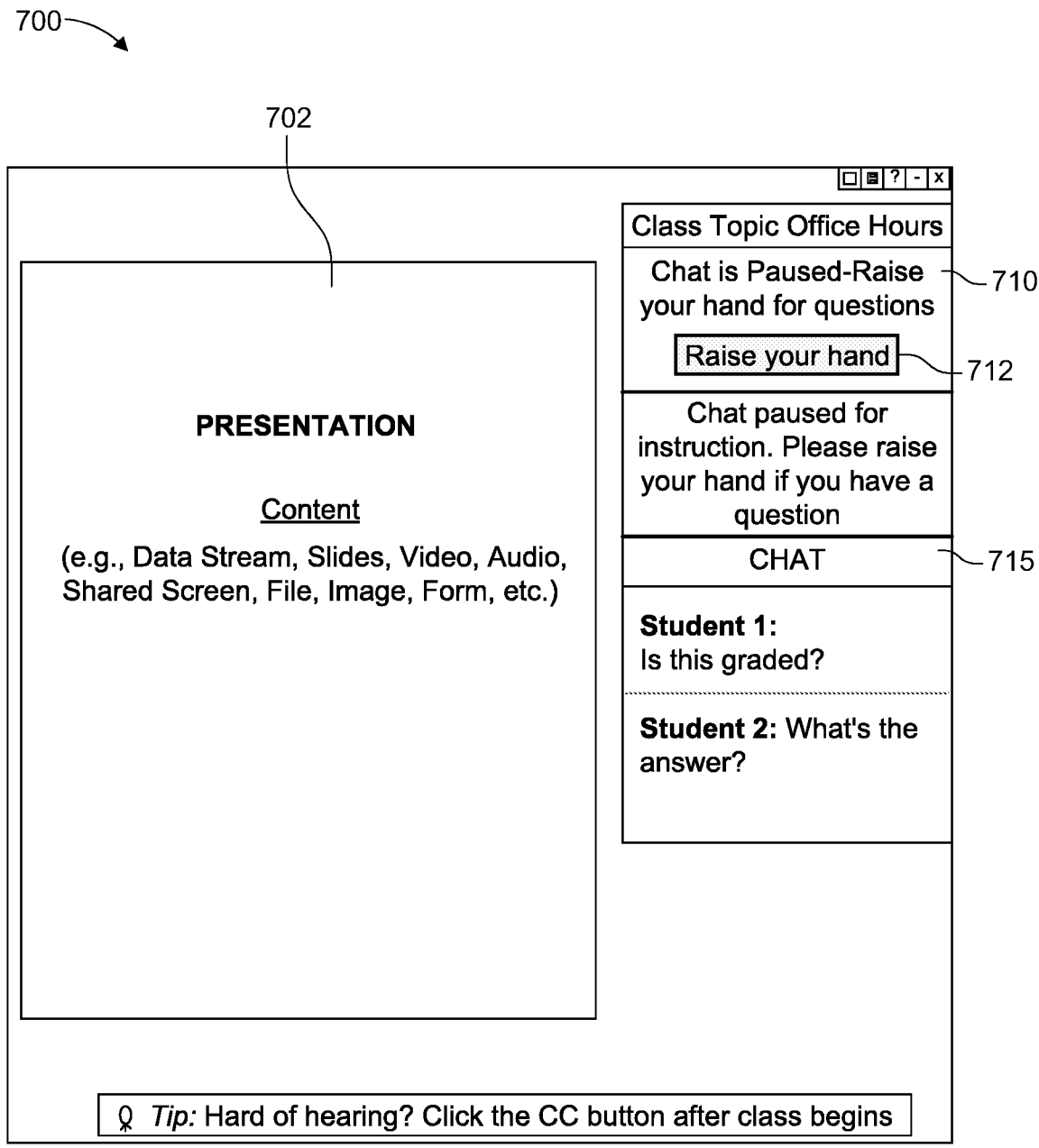
FIGS. 7A-7B illustrate example user interfaces for example live class sessions, in accordance with some examples of the present disclosure.

FIG. 7A illustrates an example user interface 700 for an example live class session. The user interface 700 is an example user interface used by a student user in a live class session. In this example, the user interface 700 includes a content section 702 where class content can be presented for the user (e.g., the student). The class content can include any type of content such as, for example and without limitation, a video, audio content, a presentation, a document, an image, text, interactive content, and/or any other type of content and/or combination thereof. In one illustrative example, the class content presented in the content section 702 can include a live stream from a live instructor. In another illustrative example, the class content presented in the content section 702 can include static content. Because a live instructor is available in the session as further explained below, the session can be classified as a live session even if the class content presented in the content section 702 is static.

The user interface 700 also includes a chat status section 710 which indicates the status of a chat 715 in the user interface 700. In this example, the chat status section 710 indicates that the chat 715 is currently paused. The chat 715 can be paused and resumed as needed by the instructor user. For example, if the instructor user wants to conduct a lesson or a portion of a lesson without interruptions from the chat 715, the instructor user can pause the chat 715 to prevent student users from posting messages to the chat 715. As another example, if one or more student users misbehave in the chat 715, the instructor user can pause the chat 715 or pause/remove the ability to post on the chat 715 by those specific student users (e.g., without pausing the chat 715 for all student users).

The chat status section 710 can include an interface element 712 that allows a student user to request an opportunity to ask a question, make a comment, post on the chat 715, etc. For example, the interface element 712 can allow a student user to "raise her hand" in class. In some examples, the interface element 712 can allow a student user to request the opportunity to ask a question, make a comment, post on the chat 715, etc., when the chat 715 is paused (and/or when the chat 715 is not paused) or despite the chat 715 being paused. In some cases, the interface element 712 can allow a student to "lower her hand" after raising her hand in order to signal that the instructor (or another student) has answered her question.

The user interface 700 can also include the chat 715 for student users and/or the live instructor to communicate/interact with each other. In some examples, the chat 715 is indicative of a live instructor being present/available as the chat functionality can be enabled and/or created by the live instructor. For example, in some cases, the chat 715 is only enabled when a live instructor is present/available and thus, in such cases, the chat 715 is only available in live sessions. In some examples, the online learning system 102 can determine that the session associated with the user interface 700 is a live session by the activation/enablement of the chat 715, which can indicate a presence/availability of a live instructor as previously explained. Accordingly, the online learning system 102 can identify tracked time for a student user in the session as live time.

As previously noted, the online learning system 102 can track the time spent by each student user in the live session and store the tracked time value for the live session. If the live instructor subsequently becomes unavailable (e.g., offline), the online learning system 102 can change the classification of the session from a live session to an on-demand session. In some examples, the online learning system 102 can classify the portion of the session before the live instructor became unavailable as a live session and the portion of the session after the live instructor became unavailable as an on-demand session. In other examples, the online learning system 102 can classify the entire session as live or on-demand.

In some examples, when the instructor status changes to unavailable, the online learning system 102 can switch classification of the session from a live session to an on-demand session, and track the time spent by the student user in the live session (or portion) and the on-demand session (or portion). The online learning system 102 can store the tracked time spent for the live session along with the tracked time spent for the on-demand session (e.g., after the session changed from live to on-demand). The online learning system 102 can identify or label the tracked time value for the on-demand session as on-demand time and the tracked time for the live session as live time. If the live instructor never becomes unavailable during the session, the session remains classified as a live session and the tracked time is identified as live time. On the other hand, if the live instructor becomes unavailable during the session, the portion of the session in which the live instructor was unavailable can be classified as an on-demand session and the tracked time for that portion of the session can be identified as on-demand time.

In some examples, to track the time spent by the student user in the session, the student device 124 can periodically (or on any other basis) ping the online learning system 102 and/or send electronic messages to the online learning system 102. In other examples, to track the time spent by the student user in the session, the online learning system 102 can additionally or alternatively ping (periodically or on any other basis) the student device 124 or send (periodically or on any other basis) electronic messages to the student device 124. The online learning system 102 can receive one or more responses (if any) from the student device 124, which the online learning system 102 can use to track the time spent by the student user in the live session.

In some examples, a ping and/or electronic message sent by the student device 124 to the online learning system 102 (and/or a response to a ping and/or electronic message sent by the online learning system 102) can include a timestamp indicating the time of activity associated with the ping and/or electronic message and information about the class associated with the session, such as information identifying the class. In some cases, the time of activity can indicate the progress of the student user within the session (e.g., what material, chapter, lesson, and/or class portion the student user is viewing). In some examples, the ping and/or electronic message (and/or a response to a ping and/or electronic message sent by the online learning system 102) can include additional information such as, for example and without limitation, a session identifier, a user identifier, a device identifier, user activity information, etc.

The information from the ping and/or electronic message (and/or from a response to a ping and/or electronic message sent by the online learning system 102) can indicate that the student user is participating in the live session, what class is associated with the live session, how much the student user has progressed during the live session and associated class, what material or class portions the student user has completed during the live session, what is the current material or class portion being accessed/presented in the live session, and/or any other state, session and/or class information. Moreover, the online learning system 102 can use the information from the ping and/or electronic message (and/or from a response to a ping and/or electronic message sent by the online learning system 102) to track the time spent in the session.

The chat 715 shown in FIG. 7A is merely one illustrative example of a communication/interaction tool that can be implemented with the user interface 700. One of ordinary skill in the art will recognize that, in other examples, the user interface 700 can include other communication/interaction tools in addition to or in lieu of the chat 715. Non-limiting examples of other communication/interaction tools include screen sharing tools, voice messaging or calling/conferencing tools, video messaging or calling/conferencing tools, instant messaging tools, collaboration tools, and/or any other communication/interaction tools.

Figure 7B:
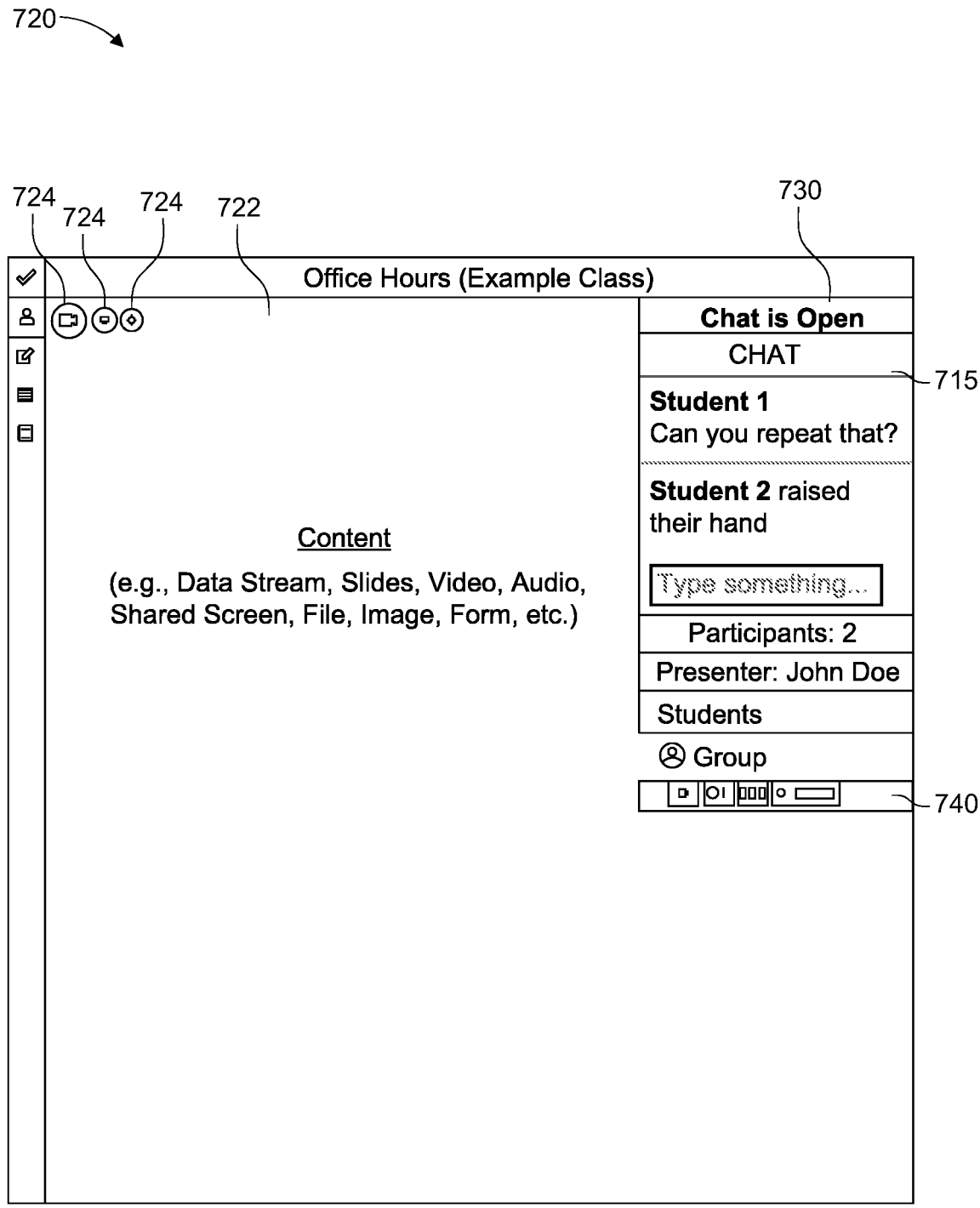

FIG. 7B illustrates an example user interface 720 for an example live class session. The user interface 720 is an example user interface used by an instructor user in a live class session. In this example, the user interface 720 includes a content section 722 where class content can be presented for student users in the live class session. The class content can include any type of content such as, for example and without limitation, video, audio, a presentation, a document, an image, text, interactive content, and/or any other type of content and/or combination thereof. In one illustrative example, the class content presented in the content section 722 can include a live stream from the instructor user. In another illustrative example, the class content presented in the content section 722 can include static content.

The user interface 720 can include presentation controls 724. The instructor user can use the presentation controls 724 to present content in the content section 722. The presentation controls 724 can include, for example and without limitation, a control for presenting a live stream (e.g., video and/or audio), a control for presenting a document, a control for sharing a screen, a control for playing a video, a control for playing audio, a control for presenting slides, a control for presenting an image, a control for presenting an animation, a control for recording a presentation and/or the live session, and/or any other content controls.

The user interface 720 can include a chat status section 730 which indicates the status of a chat 715 in the user interface 720. In this example, the chat status section 730 indicates that the chat 715 is currently open. The chat 715 can be open (e.g., users can post to the chat), closed (e.g., users are prevented from posting to the chat), paused, etc., by the instructor user. In some examples, the chat status section 730 can be selectable by the instructor user to change the status of the chat 715. For example, the chat 715 status shown in FIG. 7B is open. The instructor user can select or click on the chat status section 730 to change the status of the chat 715 to closed or paused. In some examples, the instructor user can select or click on the chat status section 730 to toggle between chat statuses (e.g., open, paused, closed, resumed, etc.). In other examples, the instructor user can select or click on the chat status section 730 to view a list of available chat statuses (e.g., open, paused, closed, etc.) from which the instructor user can select to change the status of the chat 715.

The chat 715 can include any chat messages posted by student users and/or the instructor user. In some examples, the chat 715 can also include any requests from student users to ask a question, make a comment, interact with one or more users, etc. For example, the chat 715 can include an indication of any student users that have "raised their hand" to obtain the attention of the instructor user for an opportunity to communicate/interact with the instructor user and/ or other student users. In some examples, a student user's ability to "raise their hand" may be contingent on the instructor user having engaged and/or activated chat controls, such as student controls 740 described below, to prevent student users from posting messages to the chat 715. For example, rather than having always enabled the functionality for student users to "raise their hand", the functionality to allow student users to "raise their hand" may be contingent on the instructor user having engaged and/or activated the chat controls. In some examples, the functionality for student users to "raise their hand" can be triggered by the instructor user engaging and/or activating the chat controls. For example, the system can detect whether the instructor user has engaged and/or activated chat controls to prevent one or more (or all) student users in the session from posting messages to the chat 715 and, in response, change the functionality that allows student users to "raise their hand" from disabled to enabled.

The user interface 720 can also include student controls 740. The instructor user can use the student controls 740 to call on student users, enable a student user's video and/or audio feed, allow a student user to share their screen, disable/pause or enable/resume a student user's chat functionality and/or access to the chat 715, call on a student user that has "raised their hand", message one or more student users, create a sidebar, disable/pause or enable/resume a student user's ability to "raise their hand", and/or any other controls for managing communications/interactions with student users.

In some cases, the chat 715 can allow a student user to "lower her hand" after "raising her hand" in order to signal that the instructor user (or another student user) has answered her question. In some implementations, the instructor user can use the student controls 740 to impose limits on the raising and/or lowering of hands by students. For example, the instructor user can use the student controls 740 to set a limit on the number of times a student (and/or all students in a session) can raise and/or lower her hand in order to prevent disruptions and/or malicious behavior. Such limits can be tracked and incremented for each student (or for all students) whenever the student raises their hand. The online learning system 102 can prevent further hand raising when a student (or all students) reaches a predetermined limit (e.g., a limit set by an administrator or the instructor). In some cases, the hand raise count can be reset if the instructor later allows for student interactions so students may raise their hands again.

In some cases, when the instructor user opens/accesses and/or enables/activates the user interface 720 for the live session, the online learning system 102 can determine that the instructor user is present/available in the session and classify the session as a live session. In some examples, the classification of the session as a live session can trigger the online learning system 102 to classify tracked time for any student users in the session as live time.

The chat 715 shown in FIG. 7B is merely one illustrative example of a communication/interaction tool that can be implemented with the user interface 720. One of ordinary skill in the art will recognize that, in other examples, the user interface 720 can include other communication/interaction tools in addition to or in lieu of the chat 715. Non-limiting examples of other communication/interaction tools include screen sharing tools, voice messaging or calling/conferencing tools, video messaging or calling/conferencing tools, instant messaging tools, collaboration tools, and/or any other communication/interaction tools.

Figure 8:
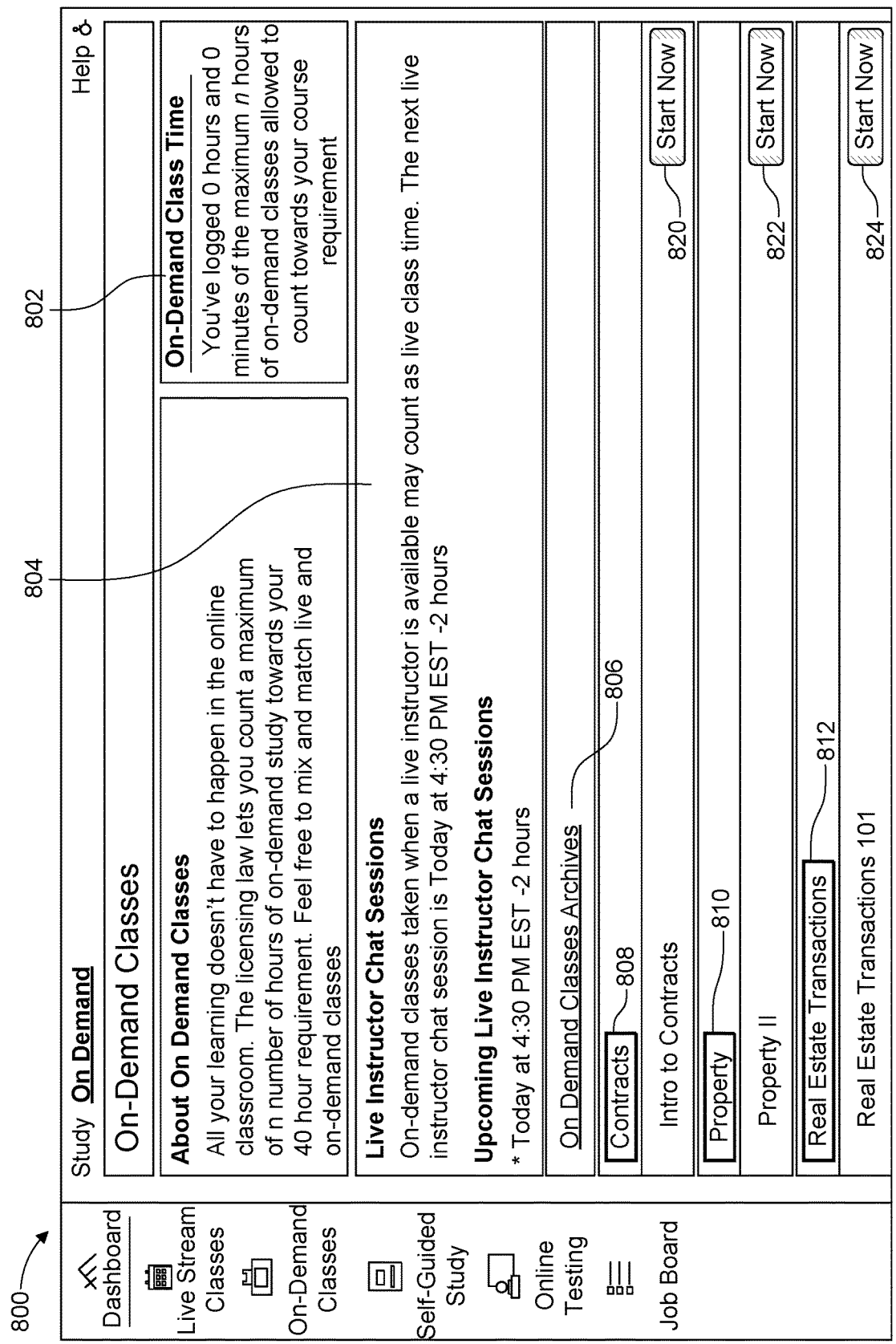
FIG. 8 illustrates an example user interface showing on-demand classes available to an example student user, in accordance with some examples of the present disclosure.
Figure 10:
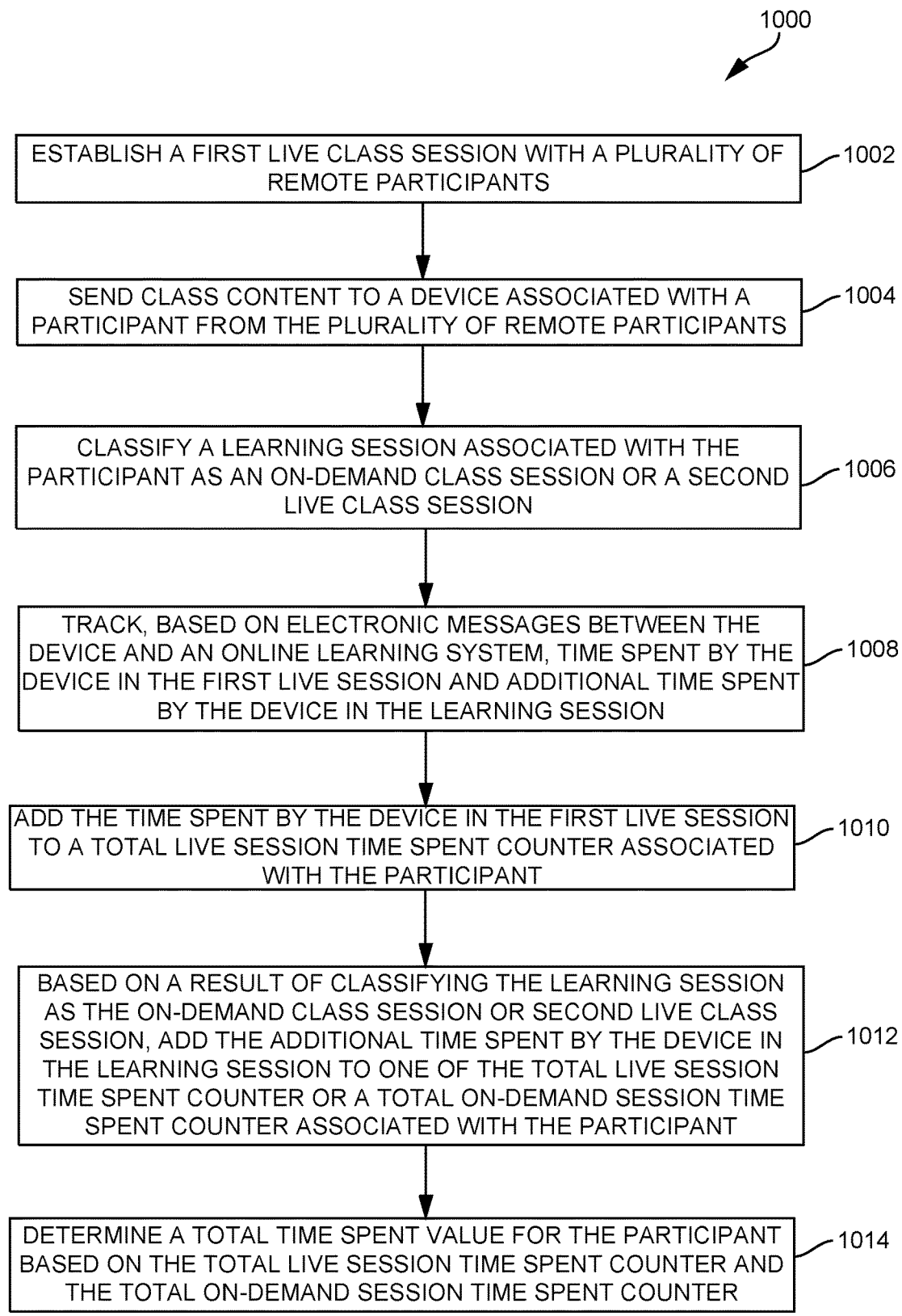
FIG. 10 is a flowchart illustrating an example process for implementing a hybrid on-demand and live class learning system, in accordance with some examples of the present disclosure.

FIG. 8 illustrates an example user interface 800 showing the on-demand classes available to an example student user. The student user can access the user interface 800 to view available on-demand classes, view the current tracked on-demand class time, view the minimum and/or maximum amount of on-demand class time allowed (e.g., in order to complete a course/class) for a particular course/class, and/or start any available on-demand classes.

In this example, the user interface 800 includes a class time section 802. The class time section 802 can display the amount of on-demand class time tracked for the student user. In some examples, the on-demand class time displayed in the class time section 802 can correspond to a specific class, course, program, etc. The class time section 802 can also display any on-demand thresholds set for a particular class, course, program, etc. For example, the class time section 802 can display a maximum and/or minimum amount of on-demand class time allowed or required for a particular class, course, program, etc. In some examples, the class time section 802 can be updated when an instructor becomes available (e.g., comes online) for interactions with the student. For example, when an instructor becomes available, the class time section 802 can change to indicate that the class time (e.g., time spent) is now being counted as live time (e.g., for as long as the instructor remains available)

In some aspects, the process 1000 can include generating a communication interface configured to enable electronic communications between the live instructor and at least a portion of the plurality of remote participants. In some examples, the electronic communications can include at least one of chats, voice communications, video communications, one or more images, multimedia content, one or more activities, and/or text messages. In some examples, the one or more activities can include a quiz, a project, an exercise, a test, and/or any other activities. In some aspects, the process 1000 can include receiving, from a second device (e.g., instructor device 122) associated with the live instructor, a request to change a status of the communication interface to one of enabled, disabled, or paused; and in response to the request, changing the status of the communication interface to the one of enabled, disabled, or paused.

In some cases, changing the status of the communication interface to the one of enabled, disabled, or paused can include disabling or pausing electronic communications via the communication interface.

In some aspects, the process 1000 can include receiving, from at least one device associated with at least one participant of the plurality of remote participants, a request to communicate with the live instructor via the communication interface, and in response to the request to communicate with the live instructor via the communication interface, enabling electronic communications via the communication interface from the at least one device associated with the at least one participant to the second device associated with the live instructor.

In some examples, classifying the learning session as the on-demand class session or the second live class session can include determining that the live instructor has enabled or interacted with the communication interface, and classifying the learning session as the second live class session based on the determining that the live instructor has enabled or interacted with the communication interface.

Figure 11:
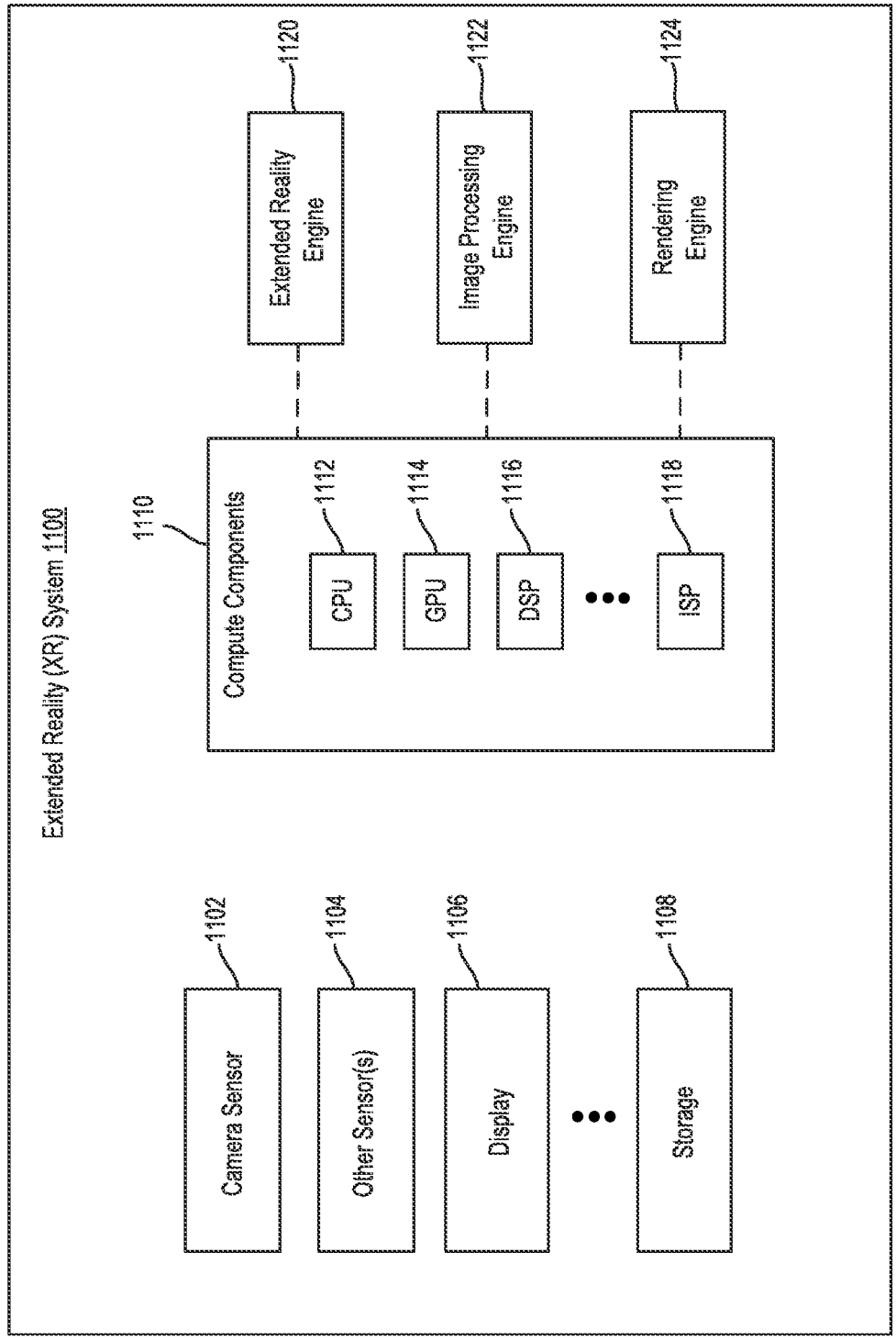
FIG. 11 is a diagram illustrating an example extended reality system for implementing aspects of the present disclosure.

In some examples, the process 1000 may be performed by one or more computing devices or apparatuses. In one illustrative example, the process 1000 can be performed by the online learning system 102 shown in FIG. 1. In some examples, the process 1000 can be performed by one or more computing devices with the computing device architecture 1100 shown in FIG. 11. In some cases, such a computing device or apparatus may include a processor, microprocessor, microcomputer, or other component of a device that is configured to carry out the steps of the process 1000. In some examples, such computing device or apparatus may include one or more sensors configured to capture image data and/or other sensor measurements. For example, the computing device can include a smartphone, a head-mounted display, a mobile device, an extended reality device (e.g., an augmented reality device, a virtual reality device, a mixed reality device, etc.) as shown in FIG. 11, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data. In some examples, the computing device or apparatus can be or can include an extended reality device (e.g., an augmented reality device, a virtual reality device, a mixed reality device, etc.), which students can use to attend on-demand and/or live class sessions, and/or the instructor can use to interact with students in a live session, create (e.g., record, send/stream, etc.) class content and/or streams, etc. In some cases, an instructor can use the computing device or apparatus to generate virtual and/or augmented reality class content for students. Moreover, a student can use the computing device or apparatus to access (e.g., view, edit, interact with, etc.) virtual and/or augmented reality class content. For example, a student can use the computing device or apparatus to display virtual and/or augmented reality class content and provide a learning experience that appears to the student as if the instructor were teaching in-person.

In some examples, an instructor can use the computing device or apparatus to generate virtual and/or augmented reality class experiences that mirror or are similar to in-person class experiences. For example, an instructor can use the computing device or apparatus to create a teaching session and/or class content within a virtual environment that mirrors an in-person classroom and/or teaching environment. To illustrate, the instructor can use the computing device or apparatus to create class content and/or teach a live session where the instructor (e.g., a video/camera feed of the instructor, an image of the instructor, an animation of the instructor, etc.) is placed within a virtual environment that mimics an in-person teaching environment. The computing device or apparatus (or a server) can then stream the content with the instructor placed in the virtual environment to one or more students. The content with the instructor placed in the virtual environment can be streamed as video to student devices. At the student devices, the streamed video can appear as if the instructor were teaching in a multi-camera studio setting that is streamed via video to the student devices.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1000 is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 11 is a diagram illustrating an example extended reality system 1100, in accordance with some examples of the disclosure. As used herein, the term extended reality (XR) can include virtual reality (VR), augmented reality (AR), mixed reality (MR), virtual reality with video pass-through, or any combination thereof.

The XR system 1100 can implement the systems and techniques disclosed herein. For example, the XR system 1100 can implement and/or can be used to participate in the hybrid live and on-demand sessions as described herein. The XR system 1100 can perform various tasks and operations such as, for example, extended reality tasks and operations (e.g., tracking, mapping, localization, content rendering, pose estimation, object detection/recognition, video pass-through, virtual content anchoring, gesture recognition, gesture rendering, etc.), image/video processing and/or post-processing, data processing and/or post-processing, computer graphics, machine vision, object modeling and registration, multimedia rendering and/or composition, time warping, frame extrapolation, and/or any other data processing tasks, effects, and/or computations.

In some examples, the XR system 1100 can perform tracking and localization; pose estimation, mapping of the physical world/environment (e.g., a scene) around the XR system 1100 (e.g., where the XR system 1100 is located); and positioning and rendering of virtual content on a screen, display, and/or visible plane/region as part of an XR experience. For example, the XR system 1100 can generate a map (e.g., a three-dimensional (3D) map) of a scene in the physical world, track a pose (e.g., a location and orientation) of the XR system 1100 relative to the scene (e.g., relative to the 3D map of the scene), position and/or anchor virtual content in a specific location(s) on the map of the scene, and render the virtual content on a display (e.g., display 1106) such that the virtual content appears to be at a physical location in the scene corresponding to the specific location on the map of the scene where the virtual content is positioned and/or anchored.

In the example shown in FIG. 11, the XR system 1100 includes a camera sensor 1102, one or more other sensors 1104, a display 1106, storage 1108, compute components 1110, an XR engine 1120, an image processing engine 1122, and a rendering engine 1124. It should be noted that the components 1102 through 1126 shown in FIG. 11 are non-limiting examples provided for illustration and explanation purposes, and other examples can include more, less, and/or different components than those shown in FIG. 11. For example, in some cases, the XR system 1100 can include one more other processing engines, one or more receivers (e.g., global positioning systems, global navigation satellite systems, etc.), one or more communications devices (e.g., radio frequency (RF) interfaces and/or any other wireless/wired communications receivers/transmitters), one or more other hardware components, additional camera sensors, and/or one or more other software and/or hardware components that are not shown in FIG. 11. An example architecture and example hardware components that can be implemented by the XR system 1100 are further described below with respect to FIG. 13.

The XR system 1100 can be part of, or implemented by, a single computing device or multiple computing devices. In some examples, the XR system 1100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an IoT (Internet-of-Things) device, a smart wearable device (e.g., a head-mounted display (HMD), smart glasses, etc.), or any other suitable electronic device(s).

In some implementations, the camera sensor 1102, the one or more other sensor(s) 1104, the display 1106, the storage 1108, the compute components 1110, the XR engine 1120, the image processing engine 1122, and rendering engine 1124 can be part of the same computing device. For example, in some cases, the camera sensor 1102, the one or more other sensor(s) 1104, the display 1106, the storage 1108, the compute components 1110, the XR engine 1120, the image processing engine 1122, and rendering engine 1124 can be integrated into a smartphone, laptop, tablet computer, smart wearable device, gaming system, and/or any other computing device. In other implementations, the camera sensor 1102, the one or more other sensor(s) 1104, the display 1106, the storage 1108, the compute components 1110, the XR engine 1120, the image processing engine 1122, and rendering engine 1124 can be part of two or more separate computing devices. For example, in some cases, some of the components 1102 through 1124 can be part of, or implemented by, one computing device and the remaining components can be part of, or implemented by, one or more other computing devices.

The camera sensor 1102 can include any image and/or video sensor or capturing device, such as a digital camera sensor, a video camera sensor, a smartphone camera sensor, an image/video capture device on an electronic apparatus such as a television or computer, a camera, etc. In some cases, the camera sensor 1102 can be part of a camera or computing device such as an XR device (e.g., an HMD, smart glasses, etc.), a digital camera, a smartphone, a smart television, a game system, etc. In some examples, the camera sensor 1102 can be part of a multiple-camera assembly, such as a dual-camera assembly. The camera sensor 1102 can capture image and/or video content (e.g., raw image and/or video data), which can then be processed by the compute components 1110, the XR engine 1120, the image processing engine 122, and/or the rendering engine 1124 as described herein.

In some examples, the camera sensor 1102 can capture image data and generate frames based on the image data and/or provide the image data or frames to the XR engine 1120, the image processing engine 1122, and/or the rendering engine 1124 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

For simplicity and explanation purposes, FIG. 11 illustrates a single camera sensor on the XR system 1100. However, in other examples, the XR system 1100 can include multiple camera sensors. Moreover, references to any of the components of the XR system 1100 in the singular or plural form should not be interpreted as limiting the number of such components implemented by the XR system 1100 to one or more than one. For example, references to a processor in the singular form should not be interpreted as limiting the number of processors implemented by the XR system 1100 to one. One of ordinary skill in the art will recognize that, for any of the components shown in FIG. 11, the XR system 1100 can include only one of such component(s) or more than one of such component(s).

The one or more other sensor(s) 1104 can include any type of sensor or sensors. For example, in some cases, the one or more other sensor(s) 1104 can include one or more inertial measurement units (IMUs), one or more radio detection and ranging (RADAR) sensors, one or more light detection and ranging (LIDAR) sensors, one or more acoustic/sound sensors, one or more infrared (IR) sensors, one or more magnetometers, one or more touch sensors, one or more laser rangefinders, one or more light sensors, one or more proximity sensors, one or more motion sensors, one or more active pixel sensors, one or more machine vision sensors, one or more ultrasonic sensors, a smart scene sensor, and/or any other sensor or combination of sensors.

In some cases, the one or more other sensors(s) 1104 can measure a pose of the XR system 1100, motion of the XR system 1100, and/or one or more characteristics of the environment around the XR system 1100. In some examples, the one or more other sensor(s) 1104 can detect a specific force and angular rate of the XR system 1100. In some cases, the one or more other sensor(s) 1104 can detect an orientation of the XR system 1100. The one or more other sensor(s) 1104 can generate linear acceleration measurements, rotational rate measurements, and/or heading measurements. In some examples, the one or more other sensor(s) 1104 can be used to measure the pitch, roll, and yaw of the XR system 1100. In some cases, the XR engine 1120 can use data and/or measurements from the camera sensor 1102 and/or the one or more other sensor(s) 1104 to track a pose of the XR system 1100.

The display 1106 can include any display device used to display content, such as virtual reality content, video pass-through content, and/or any type of content. In some examples, the display 1106 can include a screen configured to output digital content (e.g., images, video, graphics, and/or any type of visual content). The display 1106 can display content at one or more display resolutions and/or one or more display refresh rates.

The storage 1108 can be any storage device(s) for storing data. Moreover, the storage 1108 can store data from any of the components of the XR system 100. For example, the storage 1108 can store data from the camera sensor 1102 (e.g., image or video data), data from the one or more other sensor(s) 1104 (e.g., measurements), data from the compute components 1110 (e.g., processing parameters, preferences, virtual content, rendering content, scene maps, tracking and localization data, object detection data, video frames, configurations, XR application data, recognition data, outputs, calculation results, etc.), data from the XR engine 1120, data from the image processing engine 1122, and/or data from the rendering engine 1124 (e.g., output frames). In some examples, the storage 1108 can include a buffer for storing frames and/or other data for processing by the compute components 1110.

The one or more compute components 1110 can include a central processing unit (CPU) 1112, a graphics processing unit (GPU) 1114, a digital signal processor (DSP) 1116, and/or an image signal processor (ISP) 1118. The compute components 1110 can perform various operations such as image enhancement, computer vision, graphics rendering, extended reality (e.g., tracking, localization, pose estimation, mapping, content anchoring, content rendering, video pass-through, etc.), image/video processing, sensor processing, recognition (e.g., text recognition, facial recognition, object recognition, feature recognition, tracking or pattern recognition, scene recognition, occlusion detection, etc.), machine learning, filtering, object detection, frame extrapolation, time warping, and/or any of the various operations described herein. In the example shown in FIG. 11, the compute components 1110 can implement an XR engine 1120, an image processing engine 1122, and a rendering engine 1124. In other examples, the compute components 1110 can also implement one or more other processing engines.

The operations for the XR engine 1120, the image processing engine 1122, and the rendering engine 1124 (and any other processing engines) can be implemented by any of the compute components 1110. In one illustrative example, the operations of the rendering engine 1124 can be executed by the GPU 1114, and the operations of the XR engine 1120 and the image processing engine 1122 can be executed by the CPU 1112, the DSP 1116, and/or the ISP 1118. In some cases, the compute components 1110 can include other electronic circuits or hardware, computer software, firmware, or any combination thereof, to perform any of the various operations described herein.

In some examples, the XR engine 1120 can perform XR operations based on data from the camera sensor 1102, the one or more other sensor(s) 1104, and/or the storage 1108. In some examples, the XR engine 1120 can perform tracking, localization, pose estimation, mapping, content anchoring, motion estimation, and/or any other XR operations/functionalities. In some examples, the XR engine 1120 can coordinate with the image processing engine 1122 and/or the rendering engine 1124 to render user interfaces, control objects, virtual content, pass-through camera frames, mixed reality content, and/or any other visual content.

The image processing engine 1122 can perform one or more image processing operations. In some examples, the image processing engine 1122 can perform image processing operations based on data from the camera sensor 1102, the one or more other sensor(s) 1104, the storage 1108, and/or one or more other devices or components. In some examples, the image processing engine 1122 can also use data from other devices or applications, such as data from or reported by other user devices and/or data provided by a user of the XR system 1100.

The image processing engine 1122 can perform image processing operations such as, for example, filtering, demosaicing, scaling, color correction, color conversion, segmentation, noise reduction filtering, spatial filtering, artifact correction, etc. The rendering engine 1124 can obtain image data generated and/or processed by the compute components 1110, the camera sensor 1102, the XR engine 1120, and/or the image processing engine 1122, and render content (e.g., virtual content, videos, images, etc.) for presentation on the display 1106.

In some examples, the image processing engine 1122 can calculate a pose of the XR system 1100, calculate motion in frames captured by the camera sensor 1102, perform time warping operations, and/or perform any other operation as described herein. In some examples, the image processing engine 1122 can use data from the camera sensor 1102, the one or more other sensor(s) 1104, the storage 1108, and/or any other components to detect objects (e.g., edges, surfaces, items on surfaces, windows, doors, walls, tables, books, devices, chairs, desks, whiteboards, humans, hands, animals, etc.) in a scene, identify characteristics of a scene and/or objects in a scene, identify occlusions in a scene, etc.

In some examples, the XR engine 1120, the image processing engine 1122, and/or the rendering engine 1124 can perform various operations to provide an XR experience to a user of the XR system 1100. An XR experience can include use of the XR system 1100 to present XR content (e.g., virtual reality content, augmented reality content, mixed reality content, etc.) to a user associated with the XR system 1100 (e.g., a user wearing the XR system 1100 and/or otherwise using the XR system 1100 for an XR experience). In some examples, the XR content and experience can be provided by the XR system 1100 through an XR application that provides a specific XR experience such as, for example, an XR online learning experience, an XR gaming experience, an XR classroom experience, an XR shopping experience, an XR entertainment experience, an XR activity (e.g., an operation, a troubleshooting activity, etc.), among others. During the XR experience, the user can view and/or interact with virtual content using the XR system 1100. In some cases, the user can view and/or interact with the virtual content while also being able to view and/or interact with a physical environment depicted by frames captured by the camera sensor 1102, allowing the user to have an immersive experience between the physical environment and virtual content mixed or integrated with the frames depicting the physical environment.

While the XR system 1100 is shown to include certain components, one of ordinary skill will appreciate that the XR system 1100 can include more or fewer components than those shown in FIG. 11. For example, the XR system 1100 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 11. An illustrative example of a computing device and hardware components that can be implemented with the XR system 1100 is described below with respect to FIG. 13.

In some examples, the systems and techniques described herein can be implemented to provide an XR classroom experience. Moreover, the systems and techniques described herein can improve online classroom experiences and make them easier to execute successfully by using XR technology for online presentations, thus reducing the complexity and skill necessary to successfully bring learning online. In some examples, the systems and techniques described herein can place the presenter (e.g., the teacher or instructor) and the audience (e.g., students) in the same virtual "world," effectively replicating the ease and impact of an in-person presentation. In other examples, the systems and techniques described herein can provide an XR broadcasting environment occupied by the presenter. By placing the presenter in an XR environment using an XR device, such as XR system 1100, the systems and techniques described herein can replicate the capabilities of a video production setup with a fraction of the complexity and expense, and allow the presenter to create dynamic and engaging content without needing staff, expensive hardware, or deep technical expertise. The output of the XR broadcasting environment can be streamed to viewers so the viewers may watch and participate in the live presentation using the computing devices that they already own, without needing any specialized hardware or software. In some cases, the output of the XR broadcasting environment can be streamed using live-streaming video technologies such as, for example and without limitation, WebRTC, HLS, and so forth.

In some examples, the XR broadcasting environment can be used for interactions in an education setting. In other examples, the XR broadcasting environment can be used for interactions in other settings such as, for example and without limitation, sports, entertainment, business, and/or any other setting. In some examples, the XR broadcasting environment can be implemented in an online/live or on-demand class setting, as previously explained.

In some cases, class objects can be created via the software's administrative interface can be marked as XR-capable (e.g., as opposed to live-streaming video) via a Boolean. In some cases, the system can automatically detect the instructor-client type (e.g., streaming video or XR) and configure the server and client software accordingly at the start of the class.

In some augmented reality (AR) implementations, the presentation in AR can render the class tools within the physical environment of the instructor (e.g., their physical office or another real-world scene), rather than placing the instructor in a virtual environment (e.g., the XR classroom), and then compose a virtual environment to display to the students using the interactions of the instructor with the virtual objects within their physical space.

In some examples, the system can present a specific instructor's upcoming class schedule or a global class schedule of all upcoming classes in an XR client (e.g., XR system 1100) with the ability for the instructor to join a live class. In some cases, instruction materials such as schedules, classes, etc., can be loaded from a database server via a course server and sent to the XR client for display. The system can provide an option to display an indication that a class is an XR-capable class on the student's class schedule.

In some examples, the XR system 1100 can present a classroom or other environment in XR and can optionally display a representation of the instructor (e.g., an avatar, a video feed, a three-dimensional rendering, etc.) moving about in the classroom as if the instructor was present in a physical room. In some cases, activity from the instructor and/or instructor's client device (e.g., gestures, movement, interactions, etc.) during an XR session can be sent to a server(s), rendered by the server(s) and composed to video before being streamed to the client device of the students. In some cases, the video can be composed and streamed from the instructor's client device to the server. The server can be connected to the instructor's client device and the student's client device, and can stream the video to the student's client device.

In some examples, video of an instructor in an environment can be captured by multiple cameras or views and streamed to the student's client device. In some cases, a view that has automatic dynamic tracking of the instructor through the environment can be streamed to the student's client device.

In some cases, students can choose and reposition their own individual views if the scene is rendered client-side (versus being streamed as video), or select from many different video streams showing different views (e.g., a close up of the whiteboard, an instructor view, etc.). Moreover, instructors can choose what view(s) to show to the students (e.g., zoom in on the whiteboard, show a full classroom, etc.) at any given time.

In some examples, student audio/video feeds (e.g., camera feed and/or microphone feed) can be visible to the instructor within the XR environment, along with a classroom chat feed and list of attendees. Instructors can "call on" students from the attendee list to pull-up their audio/video feed to interact with them in real time. In some cases, flat two-dimensional (2D) student video "windows" can appear in the instructor environment for interaction and/or can be displayed on a virtual device for the instructor to interact with.

The XR environment can include a "hand raise" functionality as previously described. Instructors can receive a notification when students raise their hand with an option to permit the instructor to call on one or more of such students.

In some examples, instructors may open (e.g., using their client device) one or more tools as XR "windows" placed in the XR environment that may be repositioned by the instructor, may be fixed in space, or may be displayed within the virtual environment as "physical" devices or objects that the instructor may interact with (e.g., a whiteboard with associated XR tools, video screens within the XR environment, a quiz book used for live student quizzes, instructor notes in a notebook, a tablet containing a student chat, an attendance list showing active participants in the classroom, etc.).

In some cases, the XR environment can depict a virtual whiteboard with drawing tools and/or a screen which may be interacted with by the instructor. In some examples, the virtual whiteboard and/or the screen may also be used for multimedia content such as, for example and without limitation, slide decks, documents, embedded video content, presentation of quizzes students can take via their client software, a web browser the instructor may interact with, etc.

The XR environment can include an instructor capability to begin and end a class session for the purposes of tracking student time spent in the live classroom and automatic classification of student participation as live time.

Students can use their XR clients (e.g., XR system 1100) to join an XR environment and participate in an "audience" if they choose to and/or are permitted to do so by the instructor. In some cases, an instructor can be associated with an avatar representing the instructor in the XR environment. The avatar can mirror or simulate the physical movements and/or gestures of the instructor using tracking techniques based on sensor data such as, for example and without limitation, camera sensor data, infrared sensor data, and/or any other technology used for hand/body tracking. In some examples, the client of the instructor (e.g., XR system 1100) can track a movement, pose, and/or gesture of one or more controllers used by the instructor and associated with the instructor's client.

An XR environment can support multi-user participation (e.g., multiple instructors presenting simultaneously in the same shared XR environment, multiple students participating in the XR environment, multiple instructors and students participating in the XR environment, etc. In some cases, the XR environment can include moderators ("TAs") that are present in the XR environment to assist instructors with student communications, one or more chats in the XR environment, calling on students in the XR environment, managing presentation materials, and/or any other moderation activities.

Course content can be automatically presented within the XR environment (e.g., an XR classroom) based on a topic selected for the class object via an administrative interface. Topic references may be stored on the class data structure in a database and accessed by the course server and/or clients. For example, a class may be coded as being about "Property Rights" in the administrative interface for the course software. Based on this, the XR classroom can automatically load any content associated with the Property Rights class topic stored in a content management system ("CMS") and place that content into the XR classroom for the instructor, including but not limited to slide decks, class quizzes, whiteboard content, multimedia content, estimated class run times, instructor speaker notes, etc.

In some cases, rather than streaming video of the XR environment, the system can stream the instructor actions and XR classroom data along with their spoken audio to student client browsers and render the scene client-side using, for example and without limitation, WebGL, OpenGL, WebAssembly-based 3D clients, and/or any other suitable technology and/or combination thereof.

In some cases, administrators can have an option to "audit" classes. For example, administrators can view a live XR class while it is in progress without joining as a presenter or student. In some cases, composed video streams of a live XR classroom can be saved and stored in a cloud-based data store for access by students and administrators after the class has been ended by the instructor. In some examples, the stored data can be used for quality control by administrative staff, content creation and reuse, studying and rewatching by students, etc.

Figure 12A:
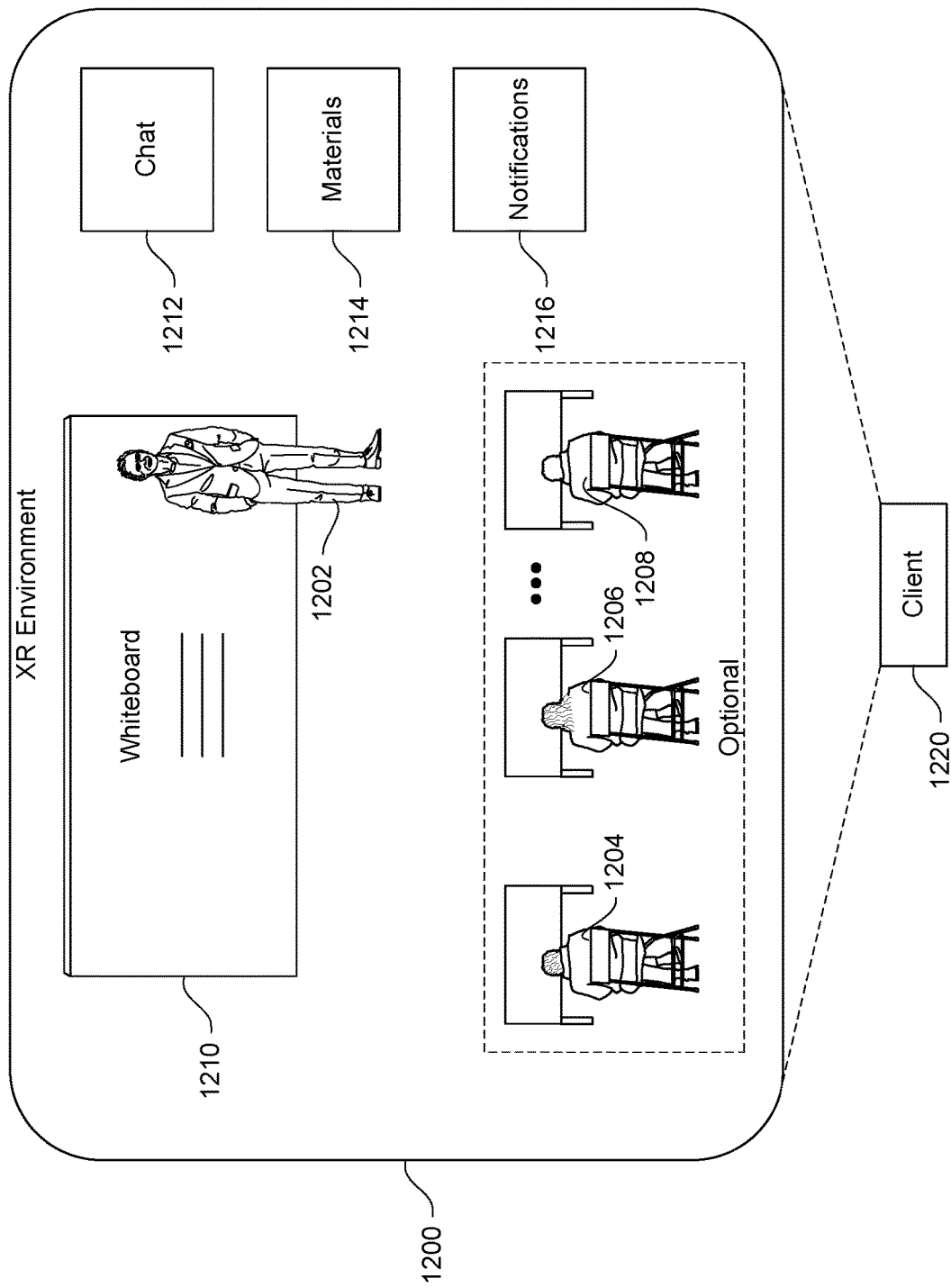
FIGS. 12A and 12B illustrate example extended reality classroom environments, in accordance with some examples of the present disclosure.

FIG. 12A illustrates an example XR classroom environment 1200 from the perspective of a student user. The student user can access, view, and/or interact with the XR classroom environment 1200 using a client device 1200. In some examples, the client device 1200 can be an XR device, such as XR system 1100 shown in FIG. 11. In other examples, the client device 1200 can be any other type of computing device such as, for example and without limitation, a laptop computer, a desktop computer, a smartphone, a smart television, a gaming console, a camera system, and/or any other computing device.

In some implementations, the XR classroom environment 1200 can depict an instructor 1202 of the class associated with the XR classroom environment 1200. The depiction of the instructor 1202 can include, for example and without limitation, an avatar associated with the instructor, a video feed of the instructor, a 3D model or rendering of the instructor or representing the instructor, an image of the instructor, or any other visual representation.

In some examples, the device used by the instructor 1202 to participate in the XR classroom environment 1200 can track movements and gestures of the instructor 1202, and send the tracked movements and gestures to the client device 1220 and/or a host or server of the XR classroom environment 1200 for presentation in the XR classroom environment 1200. Thus, the XR classroom environment 1200 can present movements and gestures performed by the instructor 1202 during the session associated with the XR classroom environment 1200. The XR classroom environment 1200 can also include any audio of the instructor recorded from the instructor's device. Each student participant can hear the audio of the instructor using their client device 1220 and/or a speaker device associated with the client device 1220.

In some cases, the XR classroom environment 1200 can depict a whiteboard 1210 where one or more users (e.g., the instructor 1202 and/or any other participants in the XR classroom environment 1200) can write and/or draw things for the classroom. In some examples, the instructor 1202 can grant student users the ability to interact with the whiteboard 1210 similar to an instructor calling a student to the whiteboard in a physical classroom setting. For example, the instructor 1202 can call on a student user to write an answer in the whiteboard 1210. The student user can be granted permission to write or draw on the whiteboard 1210. The instructor can also optionally restrict one or more student users from being able to write or draw on the whiteboard 1210.

In some examples, the student user associated with the client device 1220 can optionally view other students 1204-1208 who have joined and/or are present in the XR classroom environment 1200. For example, visual representations of other students 1204-1208 can optionally be depicted in the XR classroom environment 1200 and viewed by the student user associated with the client device 1220. The depiction of the students 1204-1208 (e.g., the visual representations of the students 1204-1208) in the XR classroom environment 1200 can include, for example and without limitation, respective thumbnails, respective avatars, respective camera feeds, respective 3D models or renderings, respective images, and/or any other visual representations of the students 1204-1208. In some cases, the client devices (e.g., client devices 1220) of the students 1204-1208 can record student audio and/or track student movements and/or gestures for presentation in the XR classroom environment 1200. In other examples, the student user associated with the client device 1220 may not view other students 1204-1208 who have joined and/or are present in the XR classroom environment 1200.

The XR classroom environment 1200 can include a chat 1212 for student users to interact with the instructor 1202 and/or each other. The instructor 1202 can enable or disable the chat 1202 as desired to allow or prevent student users from posting messages to the chat 1202. In some cases, the instructor 1202 can enable or disable the chat 1202 for all student users or only one or more selected student users. For example, if a student user is being disruptive, the instructor 1202 can temporarily or permanently disable that student user's ability to post messages to the chat 1202. In some cases, the chat 1202 can include an option that allows the instructor 1202 to call on particular student user's to post a message to the chat 1202 such as, for example, an answer to a question.

The XR classroom environment 1200 can optionally include class materials 1214. The class materials 1214 can be accessible to the instructor 1202 and/or the student users. The instructor 1202 can add and/or remove materials from the class materials 1214 as desired and/or allow student users to upload content to the class materials 1214, such as exercises or presentations. The class materials 1214 can include, for example and without limitation, multimedia content, lessons, quizzes, exams, chapters, exercises, notes, presentations, audio, files, and/or any other content.

In some examples, the XR classroom environment 1200 can include a notifications section 1216 for displaying information and/or notifications associated with the class session corresponding to the XR classroom environment 1200. For example, the notifications section 1216 can display live time spent associated with the class session, messages and/or announcements from the instructor 1202, system-wide announcements, status information, closed caption information, instructions, a total time spent by the student user in the entire class, a value representing a participation (and/or an amount of participation) by the student user, etc. In some cases, the notifications section 1216 can include information visible to every student user in the XR classroom environment 1200. In some cases, the notifications section 1216 can additionally or alternatively include information specific to a student user such that the information seen in the notifications section 1216 by one student user may differ from the information seen in the notifications section 1216 by another student user.

Figure 12B:
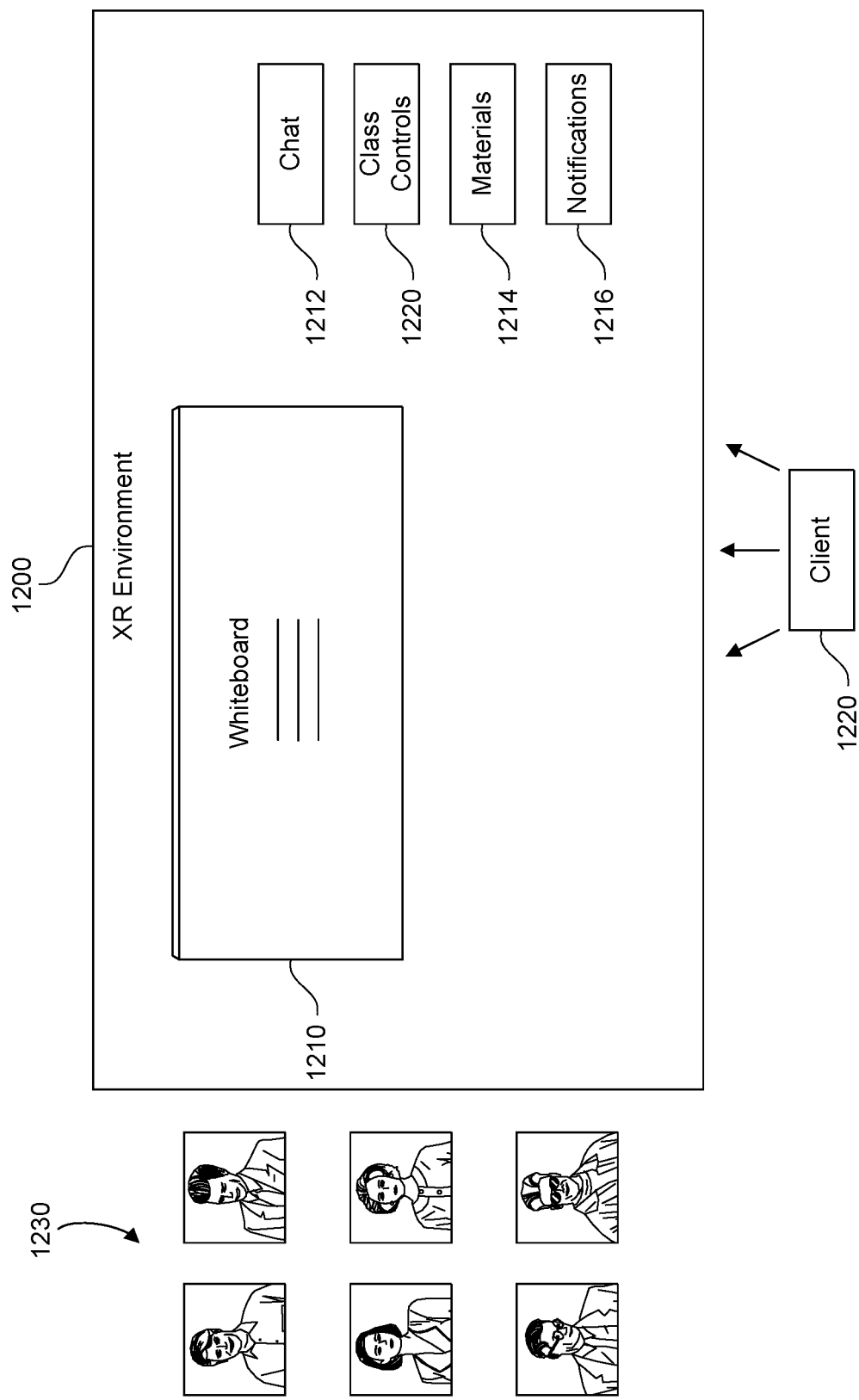

FIG. 12B illustrates an example of the XR classroom environment 1200 from the perspective of the instructor 1202. In some examples, the instructor can view and interact with the XR classroom environment 1200 using the client device 1220. As previously explained, the client device 1220 can be an XR device, such as XR system 1100 shown in FIG. 11, or can be any other computing device such as, for example and without limitation, a laptop computer, a desktop computer, a smart television, a smartphone, a gaming console, a camera system, or any other computing device.

The client device 1220 can record audio from the instructor for output/presentation in the XR classroom environment 1200, can allow the instructor to interact with the chat 1212, class controls 1220, class materials 1214, notifications section 1216, the whiteboard 1210, student users, etc. In some examples, the client device 1220 can track movements and/or gestures by the instructor and provide the tracking information to the host or server of the XR classroom environment 1200 for rendering in the XR classroom environment 1200. The XR classroom environment 1200 can thus depict any movements or gestures by the instructor during the class session associated with the XR classroom environment 1200.

The client device 1220 can optionally depict visual representations 1230 of other students 1204-1208 who have joined and/or are present in the class session, for the instructor to see each of the students 1204-1208 (or representations thereof) as well as any movement and/or gestures by the students 1204-1208. The instructor can use the client device 1220 to interact with any of the students 1204-1208 within the XR classroom environment 1200 or outside of the XR classroom environment 1200, much like in the physical world. In some cases, the visual representations 1230 of the students 1204-1208 can be depicted outside of the XR classroom environment 1200. For example, the client device 1220 can depict the visual representations 1230 (e.g., windows, video streams or feeds, images, avatars, thumbnails, 3D models or renderings, images, etc.) of the students 1204-1208 in an area outside of the XR classroom environment 1200. In other cases, the visual representations 1230 of the students 1204-1208 can be depicted within the XR classroom environment 1200 much like in a physical classroom.

The class controls 1220 can allow the instructor to manage one or more aspects of the class session associated with the XR classroom environment 1200. For example, the class controls 1220 can allow the instructor to enable or disable the chat 1212 (for all student users or for one or more specific student users), call on specific student users, enable or disable student access or interactions with the whiteboard 1210 (for all student users or for one or more specific student users), manage the class materials 1214, manage the notifications section 1216, manage what content and/or materials is/are presented to the students 1204-1208 within the XR classroom environment 1200, begin and/or end the class session associated with the XR classroom environment 1200, manage a configuration of the XR classroom environment 1200, upload and/or download content, begin and/or end activities during the class session associated with the XR classroom environment 1200, switch from an XR environment to another setting such as a video feed or vice versa, enable and/or disable interactions between the students 1204-1208, etc.

Figure 13:
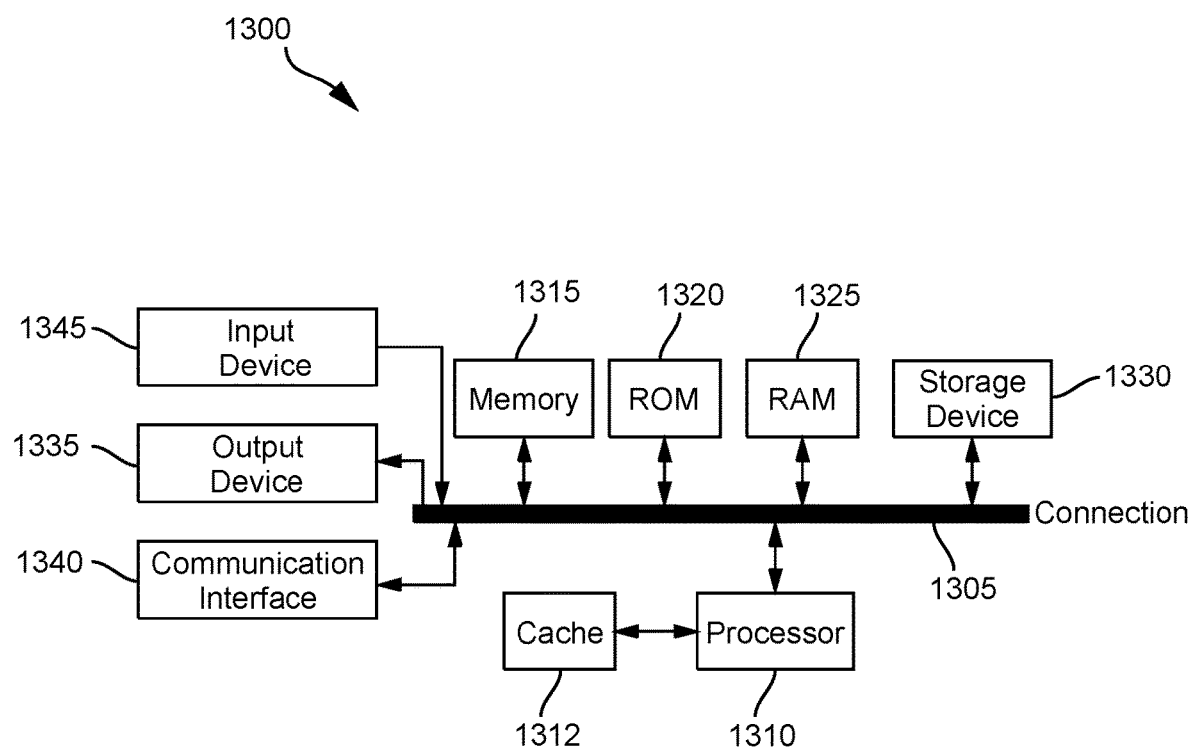
FIG. 13 is a diagram illustrating an example computing device architecture, in accordance with some examples of the present disclosure.

FIG. 13 illustrates an example computing device architecture 1300 of an example computing device which can implement the systems and techniques described herein. For example, the computing device architecture 1300 can implement at least some portions of the online learning system 102 shown in FIG. 1, the administrator device 120 shown in FIG. 1, the instructor device 122 shown in FIG. 1, the student device 124 shown in FIG. 1, the XR system 1100 shown in FIG. 11, and/or the client device 1220 shown in FIGS. 12A-12B. The components of the computing device architecture 1300 are shown in electrical communication with each other using a connection 1305, such as a bus. The example computing device architecture 1300 includes a processing unit (CPU or processor) 1310 and a computing device connection 1305 that couples various computing device components including the computing device memory 1315, such as read only memory (ROM) 1320 and random access memory (RAM) 1325, to the processor 1310.

The computing device architecture 1300 can include a cache of high-speed memory connected directly with, in close proximity to, or integrated as part of the processor 1310. The computing device architecture 1300 can copy data from the memory 1315 and/or the storage device 1330 to the cache 1312 for quick access by the processor 1310. In this way, the cache can provide a performance boost that avoids processor 1310 delays while waiting for data. These and other modules can control or be configured to control the processor 1310 to perform various actions. Other computing device memory 1315 may be available for use as well. The memory 1315 can include multiple different types of memory with different performance characteristics. The processor 1310 can include any general-purpose processor and a hardware or software service stored in storage device 1330 and configured to control the processor 1310 as well as a special-purpose processor where software instructions are incorporated into the processor design. The processor 1310 may be a self-contained system, containing multiple cores or processors, a bus, memory controller, cache, etc. A multi-core processor may be symmetric or asymmetric.

To enable user interaction with the computing device architecture 1300, an input device 1345 can represent any number of input mechanisms, such as a microphone for speech, a touch-sensitive screen for gesture or graphical input, keyboard, mouse, motion input, speech and so forth.

An output device 1335 can also be one or more of a number of output mechanisms known to those of skill in the art, such as a display, projector, television, speaker device. In some instances, multimodal computing devices can enable a user to provide multiple types of input to communicate with the computing device architecture 1300. The communication interface 1340 can generally govern and manage the user input and computing device output. There is no restriction on operating on any particular hardware arrangement and therefore the basic features here may easily be substituted for improved hardware or firmware arrangements as they are developed.

Storage device 1330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1325, read only memory (ROM) 1320, and hybrids thereof. The storage device 1330 can include software, code, firmware, etc., for controlling the processor 1310. Other hardware or software modules are contemplated. The storage device 1330 can be connected to the computing device connection 1305. In one aspect, a hardware module that performs a particular function can include the software component stored in a computer-readable medium in connection with the necessary hardware components, such as the processor 1310, connection 1305, output device 1335, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, head-mounted displays (e.g., virtual reality devices, augmented reality devices, etc.), smart glasses (e.g., virtual reality glasses, augmented reality glasses, etc.), standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method comprising: sending, to a remote device associated with a user, content associated with one or more classes; classifying a learning session associated with the user as an on-demand class session or a live class session based on an availability of a live instructor to communicate with the user via a network while the user accesses the content during the learning session; tracking, based on electronic messages between the device and an online learning system, time spent by the device in the learning session; based on a result of classifying the learning session as the on-demand class session or the live class session, adding the time spent by the device in the learning session to one of a total live session time spent counter or a total on-demand session time spent counter associated with the user; and determining a total time spent value for the user based on the total live session time spent counter and the total on-demand session time spent counter.

Aspect 2. The method of Aspect 1, further comprising: providing, to a user interface associated with the device, display data comprising an indication of a progress of the user in a course associated with the learning session.

Aspect 3. The method of any of Aspects 1 to 2, further comprising: establishing at least one live class session with one or more remote participants, wherein the one or more remote participants comprise the user, and wherein the at least one live class session comprises livestreamed data; tracking, based on electronic messages between the device and the online learning system, additional time spent by the device in the at least one live class session; and adding the additional time spent by the device in the at least one live class session to the total live session time spent counter associated with the user.

Aspect 4. The method of Aspect 3, further comprising: classifying the additional time spent by the device in the at least one live class session as live class time based on a result of classifying the at least one live class session as a live class session; wherein adding the additional time spent by the device in the at least one live class session to the total live session time spent counter is further based on the classifying of the additional time spent as live class time.

Aspect 5. The method of any of Aspects 1 to 4, further comprising: adding the time spent by the device in the learning session to the total live session time spent counter when the time spent is classified as live class time.

Aspect 6. The method of any of Aspects 1 to 4, further comprising: adding the time spent by the device in the learning session to the total on-demand session time spent counter when the time spent is classified as on-demand class time.

Aspect 7. The method of any of Aspects 1 to 6, wherein classifying the learning session as the on-demand class session or the live class session comprises: determining whether the live instructor is available to communicate with the user via the network while the user accesses the content during the learning session; and classifying the learning session as the on-demand class session based on a determination that the live instructor is not available to communicate with the user via the network while the user accesses the content during the learning session.

Aspect 8. The method of any of Aspects 1 to 6, wherein classifying the learning session as the on-demand class session or the live class session comprises: determining whether the live instructor is available to communicate with the user via the network while the user accesses the class content during the learning session; and classifying the learning session as the live class session based on a determination that the live instructor is available to communicate with the user via the network while the user accesses the class content during the learning session.

Aspect 9. The method of any of Aspects 1 to 8, further comprising: generating a communication interface configured to enable electronic communications between the live instructor and the user, wherein the electronic communications comprise at least one of chats, voice communications, video communications, one or more images, multimedia content, one or more activities, and text messages.

Aspect 10. The method of Aspect 9, further comprising: receiving, from a second device associated with the live instructor, a request to change a status of the communication interface to one of enabled, disabled, or paused; and in response to the request, changing the status of the communication interface to the one of enabled, disabled, or paused.

Aspect 11. The method of Aspect 10, wherein changing the status of the communication interface to the one of enabled, disabled, or paused comprises disabling or pausing electronic communications via the communication interface.

Aspect 12. The method of any of Aspects 9 to 11, further comprising: receiving, from the device, a request to communicate with the live instructor via the communication interface; and in response to the request to communicate with the live instructor via the communication interface, enabling electronic communications via the communication interface from the device to the second device associated with the live instructor.

Aspect 13. The method of any of Aspects 9 to 12, wherein classifying the learning session as the on-demand class session or the live class session comprises: determining that the live instructor has enabled or interacted with the communication interface; and classifying the learning session as a live class session based on the determining that the live instructor has enabled or interacted with the communication interface.

Aspect 14. The method of any of Aspects 9 to 12, wherein classifying the learning session as the on-demand class session or live class session comprises: automatically classifying the learning session as the live class session based on a scheduled time for an instructor interaction session.

Aspect 15. The method of any of Aspects 1 to 14, further comprising: classifying the learning session as the live class session; and determining that the live class session has ended based on at least one of an input from the live instructor disabling one or more communication interfaces used for an interaction session with the live instructor, a lack of instructor interaction for a period of time, a determination that the live instructor has logged off or terminated the live class session, and a scheduled end time.

Aspect 16. The method of any of Aspects 1 to 15, further comprising: reconciling time values from the total live session time spent counter and the total on-demand session time spent counter to yield a reconciled time value, wherein one or more first time values from the time values indicate an amount of time spent by the device accessing the content associated with the learning session and one or more second time values from the time values indicate an amount of time spent by the device in at least one live class session.

Aspect 17. The method of Aspect 16, wherein the total time spent value for the user comprises the reconciled time value, and wherein reconciling the time values from the total live session time spent counter and the total on-demand session time spent counter comprises excluding, from the reconciled time value, a first tracked time value associated with time spent by the device in the at least one live class session or the learning session, the first tracked time value being excluded from the reconciled time value based on a determination that the first tracked time value corresponds to a same or overlapping portion of content associated with a second tracked time value.

Aspect 18. The method of any of Aspects 1 to 17, further comprising: determining that the live instructor is available to communicate with the user via the network during a portion of the learning session, and unavailable to communicate with the user via the network during a different portion of the learning session; classifying the portion of the learning session as the live class session based on the determining that the live instructor is available to communicate with the user via the network during the portion of the learning session; classifying the different portion of the learning session as the on-demand class session based on the determining that the live instructor is unavailable to communicate with the user via the network during the different portion of the learning session; and adding a first respective time spent by the device in the portion of the learning session to the total live session time spent counter and a second respective time spent by the device in the different portion of the learning session to the total on-demand class time.

Aspect 19. A system comprising: one or more processors; and at least one non-transitory computer-readable storage medium containing instructions which, when executed by the one or more processors, cause the one or more processors to perform a method according to any of Aspects 1 to 18.

Aspect 20. A non-transitory computer-readable storage medium containing instructions which, when executed by one or more processors, cause the one or more processors to perform a method according to any of Aspects 1 to 18.

Aspect 21. A system comprising means for performing a method according to any of Aspects 1 to 18.

Aspect 22. A method comprising: generating an extended reality classroom environment comprising at least one of a virtual whiteboard, a virtual chat, one or more content items, and a virtual notifications section; receiving, via a client device, one or more inputs to the extended reality classroom environment; and displaying, via the client device, the extended reality classroom environment and one or more actions within the extended reality classroom environment, the one or more actions corresponding to the one or more inputs.

Aspect 23. The method of Aspect 22, wherein the extended reality classroom environment further comprises a visual representation of an instructor user associated with the extended reality classroom environment.

Aspect 24. The method of Aspect 23, wherein the visual representation comprises at least one of a video feed captured by a respective device of the instructor user, an image of the instructor user, an avatar associated with the instructor user, a three-dimensional model of the instructor user, and a thumbnail representing the instructor user.

Aspect 25. The method of any of Aspects 22 to 24, wherein the extended reality classroom environment further comprises one or more respective visual representations of one or more student participants in the extended reality classroom environment.

Aspect 26. The method of Aspect 25, wherein each respective visual representation of a student participant comprises at least one of a video feed captured by a respective device of the student participant, an image of the student participant, an avatar associated with the student participant, a three-dimensional model of the student participant, and a thumbnail representing the student participant.

Aspect 27. The method of any of Aspects 22 to 26, wherein the one or more inputs comprise at least one of a user gesture, a message posted to the virtual chat, an upload of a content item to the extended reality classroom environment, a notification to the virtual notifications section, an interaction with one or more users in the extended reality classroom environment, a request to interact with one or more users in the extended reality classroom environment, and a modification to the virtual whiteboard.

Aspect 28. The method of any of Aspects 22 to 27, further comprising: classifying at least a portion of a session associated with the extended reality classroom environment as a live class session based on at least one of a determination that a live instructor user has enabled instructor interactions with one or more student users through the extended reality classroom environment, a determination that the live instructor user has interacted with one or more student users in the extended reality classroom environment, and a determination that the live instructor user is available for interactions with one or more student users through the extended reality classroom environment.

Aspect 29. The method of any of Aspects 22 to 27, further comprising automatically classifying at least a portion of a session associated with the extended reality classroom environment as a live class session based on a scheduled time for an instructor interaction session.

Aspect 30. The method of any of Aspects 22 to 29, further comprising: determining that a live instructor session through the extended reality classroom environment has ended; and classifying time spent in at least a portion of a session that is associated with the extended reality classroom environment and did not overlap with the live instruction session as on-demand class time.

Aspect 31. The method of any of Aspects 22 to 30, wherein the extended reality classroom environment further comprises one or more class controls, and wherein the one or more class controls comprise at least one of a control to enable or disable the virtual chat for one or more student users, a control to enable or disable one or more interactions by one or more student users, a control to start or end a live instructor session during a presentation of the extended reality classroom environment, and a control to enable or disable one or more interactions with the virtual whiteboard.

Aspect 32. The method of any of Aspects 22 to 31, wherein the client device comprises a head-mounted display or smart glasses.

Aspect 33. The method of any of Aspects 22 to 31, wherein the client device comprises at least one of a laptop computer, a desktop computer, a smartphone, a smart television, a video camera system, and a gaming console.

Aspect 34. The method of any of Aspects 22 to 33, further comprising: outputting audio associated with the extended reality classroom environment, the audio comprising recorded audio from one or more devices associated with one or more users of the extended reality classroom environment.

Aspect 35. The method of any of Aspects 22 to 34, further comprising: displaying a representation of a gesture detected from one or more users of the extended reality classroom environment.

Aspect 36. A system comprising: one or more processors; and at least one non-transitory computer-readable storage medium containing instructions which, when executed by the one or more processors, cause the one or more processors to perform a method according to any of Aspects 22 to 35.

Aspect 37. A non-transitory computer-readable storage medium containing instructions which, when executed by one or more processors, cause the one or more processors to perform a method according to any of Aspects 22 to 35.

Aspect 38. A system comprising means for performing a method according to any of Aspects 22 to 35.

What is claimed is:
1. A method comprising:
   determining, by a computer system comprising one or more processors, whether an instructor or instructor account has enabled or interacted with a communication interface associated with at least one learning session of a user while a first device associated with the user accesses or displays pre-recorded content of the at least one learning session or whether a second device associated with the instructor has established a communication session over a network with the communi- cation interface or the first device while the first device accesses or displays the pre-recorded content of the at least one learning session;

based on the determining whether the instructor or instructor account has enabled or interacted with the communication interface while the first device accesses or displays the pre-recorded content of the at least one learning session or whether the second device associated with the instructor has established the communication session over the network with the communication interface or the first device while the first device accesses or displays the pre-recorded content of the at least one learning session, determining, by the computer system comprising one or more processors, an availability of the instructor to communicate with the user over the network and via the second device while the first device associated with the user accesses or displays the pre-recorded content;

classifying, by the computer system comprising one or more processors, the at least one learning session as an on-demand class session or a live class session based on the availability of the instructor to communicate with the user over the network and via the second device while the first device associated with the user accesses or displays the pre-recorded content;

based on electronic messages between the first device associated with the user and the computer system comprising one or more processors, tracking, by the computer system comprising one or more processors, time spent by the first device associated with the user in the at least one learning session;

based on a result of classifying the at least one learning session as the on-demand class session or the live class session, adding, by the computer system comprising one or more processors, the time spent by the first device associated with the user in the at least one learning session to one of a total live session time spent counter or a total on-demand session time spent counter associated with the user; and causing a display device to display a total time spent value generated for the user based on at least one of the total live session time spent counter and the total on-demand session time spent counter.

2. The method of claim 1, further comprising:
providing, to the display device, display data comprising an indication of a progress of the user in a course associated with the at least one learning session, wherein the display device is part of or communicatively coupled to the first device associated with the user or the second device associated with the instructor.

3. The method of claim 1, further comprising:
establishing at least one live class session with one or more remote participants, wherein the one or more remote participants comprise the user, and wherein the at least one live class session comprises livestreamed data;

tracking, based on electronic messages between the first device and the computer system, additional time spent by the first device in the at least one live class session; and adding the additional time spent by the first device in the at least one live class session to the total live session time spent counter associated with the user.

4. The method of claim 3, further comprising:
classifying the additional time spent by the first device in the at least one live class session as live class time based on a result of classifying the at least one live class session as a live class session;

wherein adding the additional time spent by the first device in the at least one live class session to the total live session time spent counter is further based on the classifying of the additional time spent as live class time.

5. The method of claim 1, further comprising:
classifying the at least one learning session as the live class session based on a determination that the instructor is available to communicate with the user over the network via the second device while the first device associated with the user accesses or displays the pre-recorded content during the at least one learning session;

classifying the time spent by the first device in the at least one learning session as live class time based on the at least one learning session being classified as the live class session; and adding the time spent by the first device in the at least one learning session to the total live session time spent counter based on the time spent being classified as the live class time.

6. The method of claim 1, further comprising:
classifying the at least one learning session as the on-demand class session based on a determination that the instructor is unavailable to communicate with the user over the network via the second device while the first device associated with the user accesses or displays the pre-recorded content during the at least one learning session;

classifying the time spent by the first device in the at least one learning session as on-demand class time based on the at least one learning session being classified as the on-demand class session; and adding the time spent by the first device in the at least one learning session to the total on-demand session time spent counter based on the time spent being classified as the on-demand class time.

7. The method of claim 1, wherein determining whether the instructor or instructor account has enabled or interacted with the communication interface while the first device accesses or displays the pre-recorded content or whether the second device associated with the instructor has established the communication session with the communication interface or the first device while the first device accesses or displays the pre-recorded content comprises determining whether the instructor has logged in to the instructor account during the at least one learning session of the user, and wherein determining the availability of the instructor to communicate with the user is based on the determining whether the instructor has logged in to the instructor account during the at least one learning session of the user.

8. The method of claim 1, wherein causing the display device to display the total time spent value of the user comprises providing, to display device, the total time spent value, wherein the display device is part of or communicatively coupled to the first device associated with the user, the second device associated with the instructor, or a third device comprising a client computer.

9. The method of claim 1, further comprising:
generating the communication interface, wherein the communication interface is configured to enable electronic communications between the first device associated with the user and the second device associated with the instructor, wherein the electronic communications comprise at least one of media content, one or more chats, one or more voice communications, one or more video communications, one or more images, one or more activities, and one or more text messages.

10. The method of claim 1, further comprising:
receiving, from the second device associated with the instructor, a request to change a status of the communication interface to one of enabled, disabled, or paused; and
in response to the request, changing the status of the communication interface to the one of enabled, disabled, or paused.

11. The method of claim 10, wherein changing the status of the communication interface to the one of enabled, disabled, or paused comprises enabling, disabling, or pausing electronic communications via the communication interface.

12. The method of claim 1, further comprising:
receiving, from the first device, a request to communicate with the instructor via the communication interface; and
in response to the request to communicate with the instructor via the communication interface, enabling electronic communications via the communication interface between the first device associated with the user and the second device associated with the instructor.

13. The method of claim 1, further comprising:
reconciling time values from the total live session time spent counter and the total on-demand session time spent counter to yield a reconciled time value, wherein the total time spent value for the user comprises the reconciled time value, and wherein reconciling the time values from the total live session time spent counter and the total on-demand session time spent counter comprises excluding, from the reconciled time value, a first tracked time value associated with time spent by the first device in at least one live class session or on-demand class session, the first tracked time value being excluded from the reconciled time value based on a determination that the first tracked time value corresponds to a same or overlapping portion of content associated with a second tracked time value.

14. The method of claim 1, further comprising:
determining that the instructor is available to communicate with the user via the network during a portion of the at least one learning session and unavailable to communicate with the user via the network during a different portion of the at least one learning session;
classifying the portion of the at least one learning session as the live class session based on the determining that the instructor is available to communicate with the user via the network during the portion of the at least one learning session;
classifying the different portion of the at least one learning session as the on-demand class session based on the determining that the instructor is unavailable to communicate with the user via the network during the different portion of the at least one learning session; and
adding a first respective time spent by the first device in the portion of the at least one learning session to the total live session time spent counter and a second respective time spent by the first device in the different portion of the at least one learning session to the total on-demand class time.

15. A system comprising:
one or more processors; and
at least one non-transitory computer-readable storage medium containing instructions which, when executed by the one or more processors, cause the one or more processors to:
determine whether an instructor or instructor account has enabled or interacted with a communication interface associated with at least one learning session of a user while a first device associated with the user accesses or displays pre-recorded content of the at least one learning session or whether a second device associated with the instructor has established a communication session over a network with the communication interface or the first device while the first device accesses or displays the pre-recorded content of the at least one learning session;
based on the determining whether the instructor or instructor account has enabled or interacted with the communication interface while the first device accesses or displays the pre-recorded content of the at least one learning session or whether the second device associated with the instructor has established the communication session over the network with the communication interface or the first device while the first device accesses or displays the pre-recorded content of the at least one learning session, determine an availability of the instructor to communicate with the user over the network and via the second device while the first device associated with the user accesses or displays the pre-recorded content;
classify the at least one learning session associated with the user as an on-demand class session or a live class session based on the availability of the instructor to communicate with the user over the network and via the second device while the first device associated with the user accesses or displays the pre-recorded content;
track, based on electronic messages between the first device and the system, time spent by the first device in the at least one learning session;
based on a result of classifying the at least one learning session as the on-demand class session or the live class session, add the time spent by the first device in the at least one learning session to one of a total live session time spent counter or a total on-demand session time spent counter associated with the user; and
provide, to the first device, a total time spent value of the user for display, the total time spent value being generated for the user based on at least one of the total live session time spent counter and the total on-demand session time spent counter.

16. The system of claim 15, wherein the at least one non-transitory computer-readable storage medium contains instructions which, when executed by the one or more processors, cause the one or more processors to:
provide, to the first device, display data comprising an indication of a progress of the user in a course associated with the at least one learning session.

17. The system of claim 16, wherein the at least one non-transitory computer-readable storage medium contains instructions which, when executed by the one or more processors, cause the one or more processors to:
establish at least one live class session with one or more remote participants, wherein the one or more remote participants comprise the user, and wherein the at least one live class session comprises livestreamed data;

track, based on electronic messages between the first device and the system, additional time spent by the first device in the at least one live class session; and add the additional time spent by the first device in the at least one live class session to the total live session time spent counter associated with the user.

18. The system of claim 15, wherein determining whether the instructor or instructor account has enabled or interacted with the communication interface while the first device accesses or displays the pre-recorded content or whether the second device associated with the instructor has established the communication session with the communication interface or the first device while the first device accesses or displays the pre-recorded content comprises determining whether the instructor has logged in to the instructor account during the at least one learning session of the user, and wherein determining the availability of the instructor to communicate with the user is based on the determining whether the instructor has logged in to the instructor account during the at least one learning session of the user.

19. The system of claim 15, wherein the at least one non-transitory computer-readable storage medium contains instructions which, when executed by the one or more processors, cause the one or more processors to:

receive, from the second device associated with the instructor, a request to change a status of the communication interface to one of enabled, disabled, or paused; and in response to the request, change the status of the communication interface to the one of enabled, disabled, or paused, wherein changing the status of the communication interface to the one of enabled, disabled, or paused comprises enabling, disabling, or pausing electronic communications via the communication interface.

20. A non-transitory computer-readable medium having stored thereon instructions which, when executed by one or more processors, cause the one or more processors to:

determine, by the one or more processors, whether an instructor or instructor account has enabled or interacted with a communication interface associated with at least one learning session of a user while a first device associated with the user accesses or displays pre-recorded content of the at least one learning session or whether a second device associated with the instructor has established a communication session over a network with the communication interface or the first device while the first device accesses or displays the pre-recorded content of the at least one learning session;

based on the determining whether the instructor or instructor account has enabled or interacted with the communication interface while the first device accesses or displays the pre-recorded content of the at least one learning session or whether the second device associated with the instructor has established the communication session over the network with the communication interface or the first device while the first device accesses or displays the pre-recorded content of the at least one learning session, determine, by the one or more processors, an availability of the instructor to communicate with the user over the network and via the second device while the first device associated with the user accesses or displays the pre-recorded content;

classify, by the one or more processors, the at least one learning session as an on-demand class session or a live class session based on the availability of the instructor to communicate with the user over the network and via the second device while the first device associated with the user accesses or displays the pre-recorded content;

based on electronic messages between the first device associated with the user and a computer system comprising the one or more processors, track, by the one or more processors, time spent by the first device associated with the user in the at least one learning session;

based on a result of classifying the at least one learning session as the on-demand class session or the live class session, add, by the one or more processors, the time spent by the first device associated with the user in the at least one learning session to one of a total live session time spent counter or a total on-demand session time spent counter associated with the user; and causing a display device to display a total time spent value generated for the user based on at least one of the total live session time spent counter and the total on-demand session time spent counter, wherein the display device is part of or communicatively coupled to the first device or the second device.

\* \* \* \* \*